United States Patent
Fujita et al.

(10) Patent No.: US 8,553,180 B2
(45) Date of Patent: Oct. 8, 2013

(54) INK-JET INK COMPOSITION FOR COLOR FILTER, COLOR FILTER, METHOD FOR PRODUCING A COLOR FILTER, AND LIQUID CRYSTAL DISPLAY DEVICE

(75) Inventors: Remi Fujita, Tokyo-to (JP); Tomonori Nishida, Tokyo-to (JP); Masato Tezuka, Tokyo-to (JP); Makiko Kawahara, Tokyo-to (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 0 days.

(21) Appl. No.: 13/120,972

(22) PCT Filed: Sep. 25, 2009

(86) PCT No.: PCT/JP2009/066619
§ 371 (c)(1),
(2), (4) Date: Mar. 25, 2011

(87) PCT Pub. No.: WO2010/038669
PCT Pub. Date: Apr. 8, 2010

(65) Prior Publication Data
US 2011/0176095 A1 Jul. 21, 2011

(30) Foreign Application Priority Data
Sep. 30, 2008 (JP) ................................ 2008-253920

(51) Int. Cl.
*G02F 1/1335* (2006.01)
(52) U.S. Cl.
USPC ........................................ 349/106; 106/31.6
(58) Field of Classification Search
USPC ......................................... 349/106; 106/31.6
See application file for complete search history.

(56) References Cited

U.S. PATENT DOCUMENTS

| 8,329,067 B2 * | 12/2012 | Nishida et al. ................ 252/586 |
| 2004/0076770 A1 * | 4/2004 | Yamashita et al. ............. 428/1.1 |
| 2008/0171272 A1 * | 7/2008 | Nakashima et al. ............. 430/7 |

FOREIGN PATENT DOCUMENTS

| JP | 09-021910 A | 1/1997 |
| JP | 2005-003861 A | 1/2005 |
| JP | 2005-173459 A | 6/2005 |
| JP | 2005-202252 A | 7/2005 |
| JP | 2007-113000 A | 5/2007 |

(Continued)

OTHER PUBLICATIONS

Machine translation of JP 2005-202252 A (Jul. 28, 2005).*

(Continued)

*Primary Examiner* — Vu A Nguyen
(74) *Attorney, Agent, or Firm* — Ladas & Parry LLP

(57) ABSTRACT

The present invention is to provide an ink-jet ink composition for a color filter, which shows excellent straightness and sustainability when ejected from a head, which is able to decrease the heaped amount of the ink and to prevent the ink from overflowing from the ink layer-forming portion, and which is able to form a cured layer with an excellent shape and excellent film properties when deposited onto a substrate by the ink-jet method. The present invention is also to provide a color filter using the same, a method for producing a color filter, and a liquid crystal display device. The ink-jet ink composition for a color filter of the present invention comprises: (A) a pigment comprising C.I. pigment blue 15:6 and C.I. pigment violet 23, (B) a pigment dispersing agent comprising a polyallylamine derivative, (C) a thermosetting binder and (D) an organic solvent, wherein the content of C.I. pigment violet 23 is 8 to 30% by weight of the pigment (A).

3 Claims, 6 Drawing Sheets

(56) References Cited

FOREIGN PATENT DOCUMENTS

| | | |
|---|---|---|
| JP | 2007-241051 A | 9/2007 |
| JP | 2008-052157 A | 3/2008 |
| JP | 2008-058377 A | 3/2008 |
| JP | 2008-181067 A | 8/2008 |
| JP | 2008-197506 A | 8/2008 |
| JP | 2008-222950 A | 9/2008 |
| JP | 2008-223007 A | 9/2008 |
| JP | 2008-225125 A | 9/2008 |
| TW | 200524979 | 8/2005 |

OTHER PUBLICATIONS

International Search Report: PCT/JP2009/066619; mailed Jan. 12, 2010.

* cited by examiner

INK-JET INK COMPOSITION FOR COLOR FILTER, COLOR FILTER, METHOD FOR PRODUCING A COLOR FILTER, AND LIQUID CRYSTAL DISPLAY DEVICE

TECHNICAL FIELD

The present invention relates to an ink-jet ink composition for a color filter, which is used for forming a cured layer in a predetermined pattern, such as a pixel. The present invention also relates to a color filter, a method for producing a color filter using the ink-jet ink composition, and a liquid crystal display device using the color filter or a color filter produced by the method.

BACKGROUND ART

With the development of personal computers in recent years, especially with the development of portable personal computers, the demand for liquid crystal display devices, especially for color liquid crystal display devices, tends to rise. Color liquid crystal display devices are expensive, however, so that there is an increasing request for cost reduction. Especially, the request for cost reduction of color filters, which are costly, is very high. Typical examples of the structure of color filters used in liquid crystal display devices, will be described using FIGS. 1A and 1B.

In general, a color liquid crystal display device (101) has a structure in which, as shown in FIG. 1A, a color filter 1 and an electrode substrate 2 (such as a TFT substrate) are faced each other; a gap 3 having a width of about 1 to 10 μm is provided therebetween and filled with a liquid crystal compound L; and the periphery of these parts is hermetically sealed with a sealing material 4. The color filter 1 has a structure in which, on a transparent substrate 5, a light-shielding member 6, a pixel 7, a protecting film 8 and a transparent electrode film 9 are stacked in this order from the closest to the transparent substrate, the light-shielding member 6 being formed in a predetermined pattern to shield the boundary portion between pixels from light, and the pixels 7 being formed in several colors (normally three primary colors of red(R), green (G) and blue(B)) and arranged in a predetermined order. Orientation films 10 are provided on the inner surface sides of the color filter 1 and the electrode substrate 2 which faces the color filter. A spacer is provided in the gap 3 to keep a cell gap between the color filter 1 and the electrode substrate constant and uniform. As the spacer, pearls 11 having a fixed particle diameter are dispersed, or as shown in FIG. 1B, a columnar spacer 12 having a height that corresponds to the cell gap, is formed in a region which is inside the color filter and overlaps the position where the light-shielding member 6 is formed. Finally, the light transmittance of each of the pixels colored in different colors or that of a liquid crystal layer disposed behind the color filter is controlled to obtain a color image.

A conventional color filter production method is a pigment dispersing method. In this method, first, a photosensitive resin layer containing dispersed pigments is formed on a substrate and then patterned to obtain a monochromatic pattern. This process is repeated three times to form color filter layers in red (R), green (G) and blue (B). This method, however, needs to repeat the same process three times to form the three colors of R, G and B, so that there is a problem of high cost; moreover, due to the repeating of the same process, there is a problem of poor yield.

A method for producing a color filter is described in Patent Literature 1, which was succeeded in overcoming the problems in such a manner that a color ink containing a thermosetting resin is ejected onto a substrate by the ink-jet method and heated to form a colored layer (pixel).

CITATION LIST

Patent Literature 1: Japanese Patent Application Laid-Open (JP-A) No. H09-21910

SUMMARY OF INVENTION

Technical Problem

To form a pixel by accurately ejecting an ink in accordance with a pattern by the ink-jet method, the ink-jet ink is needed to have ejection properties for being ejected from an ejection head, straightness and sustainability when ejected from the head. In the case of forming a colored layer (pixel) by ejecting an ink onto a substrate by the ink-jet method and heating the same, unlike patterning a uniformly-formed photosensitive resin layer, the colored layer is characterized by that the layer thickness is not uniform; therefore, it is needed to give a pixel an excellent shape and thus high luminance and high contrast, while realizing a specific color.

Also in recent years, there is an increasing demand for a liquid crystal display with high contrast. To meet the demand, a decrease in the particle diameter of a pigment is needed. Because of this, there is an increase in the surface area of pigment particles in an ink-jet ink composition for a color filter, so that it is needed to increase the added amount of a pigment dispersing agent that is necessary for dispersing the pigment uniformly. Uniform dispersion of pigment particles is obtained by increasing the added amount of the pigment dispersing agent. As a result, however, there is a deterioration in heat resistance, causing a problem of decreasing luminance.

In addition, when the particle diameter of a pigment is decreased, there is a problem of an increase in ink viscosity higher than ever before. When ink viscosity is increased, poor ink-jet ink ejection takes place, so that it is needed to decrease the solid content in the ink. When the solid content of the ink is decreased, however, it is necessary to increase the heaped amount (deposited amount) of the ink per unit area in order to color a pixel a desired color. When the heaped amount of the ink is increased, however, the film of the ink deposited in an ink layer-forming portion formed on the substrate is broken, so that the ink could overflow and be mixed with other color.

The present invention was achieved in view of the above circumstances. A first object of the invention is to provide an ink-jet ink composition for a color filter, which shows excellent straightness and sustainability when ejected from the head, which is able to decrease the heaped amount of the ink and to prevent the ink from overflowing from the ink layer-forming portion, and which is able to form a cured layer with an excellent shape and excellent film properties when ejected onto a substrate by the ink-jet method.

A second object of the present invention is to provide a color filter which has high productivity and pixels having specific colors and showing excellent luminance and excellent contrast.

A third object of the present invention is to provide a method for producing a color filter with high productivity, using the above-mentioned ink composition.

Finally, a fourth object of the present invention is to provide a liquid crystal display device with high reliability, using the above-mentioned color filter.

Solution to Problem

The ink-jet ink composition for a color filter of the present invention is an ink-jet ink composition for a color filter comprising: (A) a pigment comprising C.I. pigment blue 15:6 and C.I. pigment violet 23, (B) a pigment dispersing agent comprising a polyallylamine derivative, (C) a thermosetting binder and (D) an organic solvent, wherein the content of C.I. pigment violet 23 is 8 to 30% by weight of the pigment (A).

According to the present invention, the ink-jet ink composition comprises (A) a pigment comprising C.I. pigment blue 15:6 and C.I. pigment violet 23, (B) a pigment dispersing agent comprising a polyallylamine derivative, (C) a thermosetting binder and (D) an organic solvent, wherein the content of C.I. pigment violet 23 is 8 to 30% by weight of the pigment (A), so that it is able to provide an ink-jet ink composition for a color filter, which shows excellent straightness and sustainability when ejected from a head, which is able to decrease the heaped amount of the ink and to prevent the ink from overflowing from the ink layer-forming portion, and which is able to form a cured layer with an excellent shape and excellent film properties when ejected onto a substrate by the ink-jet method.

The ink-jet ink composition for a color filter of the present invention is preferably such that when the ink composition is formed into a film having a film thickness of 1.9 μm and showing a value y of 0.105 under illuminant C, the content of the pigment dispersing agent (B) is 5 to 20% by weight of the solid content of the ink composition, from the point of view that the cured layer shows excellent film properties such as heat resistance.

The ink-jet ink composition for a color filter of the present invention is preferably such that when the ink composition is formed into a film having a film thickness of 1.9 μm and showing a value y of 0.105 under illuminant C, the weight ratio of the pigment (A) to the solid content other than the pigment (A) (the pigment/the solid content other than the pigment) is 0.1 to 0.4, from the point of view that the ink-jet ink composition shows excellent straightness and sustainability when ejected from the head, and it is also able to decrease the heaped amount of the ink and to prevent the ink from overflowing from the ink layer-forming portion.

The ink-jet ink composition for a color filter of the present invention is preferably such that when the composition is immediately used as an ink that can be ejected from the head, it has a viscosity of 5 to 11 mPa·s at 23° C., from the point of view that it shows excellent straightness and sustainability when ejected from the head.

In the ink-jet ink composition for a color filter of the present invention, the pigment (A) preferably has an average dispersed particle diameter of 10 to 100 nm, from the viewpoint of improving contrast.

The ink-jet ink composition for a color filter of the present invention is preferably such that when the ink is formed into a uniform film showing a value y of 0.105 under illuminant C, in the relationship of the formula $Y=aX^b$ in which horizontal axis X means the film thickness and vertical axis Y means the weight ratio of the pigment (A) to the solid content other than the pigment (A), a is in the range of $0.40<a<0.64$ and b is in the range of $-1.27<b<-1.20$, from the point of view that it is able to decrease the ratio of the pigment/the solid content other than the pigment.

The color filter of the present invention is a color filter comprising a transparent substrate and a pixel provided thereon, wherein the pixel thickness is not uniform in the region of the pixel; at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A).

In the color filter of the present invention, the pixel thickness is not uniform in the region of the pixel; at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A), so that the color filter is a color filter which has high productivity and pixels having specific colors and showing excellent luminance and excellent contrast.

The color filter of the present invention is preferably such that when the blue pixel has a film thickness of 2.0 μm and shows a value y of 0.105 under illuminant C, the content of the pigment dispersing agent (B) is 5 to 20% by weight of the blue pixel, from the point of view that the blue pixel is provided with excellent film properties such as heat resistance.

The color filter of the present invention is preferably such that when the blue pixel has a film thickness of 2.0 μm and shows a value y of 0.105 under illuminant C, the weight ratio of the pigment (A) to the solid content other than the pigment (A) (the pigment/the solid content other than the pigment) is 0.1 to 0.4, from the point of view that it is able to prevent the ink from overflowing from the ink layer-forming portion and to suppress color mixture.

In the color filter of the present invention, the pigment of the blue pixel preferably has an average dispersed particle diameter of 10 to 100 nm, from the point of view that there is an increase in contrast.

The present invention provides a method for producing a color filter, comprising: a process of forming an ink layer by selectively depositing the ink-jet ink composition for a color filter according to the present invention by an ink-jet method, and a process of forming a pixel by curing the ink layer.

The present invention also provides a liquid crystal display device in which a display-side substrate and a liquid crystal driving-side substrate are faced each other and liquid crystal is injected therebetween, wherein the display-side substrate is the color filter according to the present invention or a color filter produced by the method according to the present invention.

Advantageous Effects of Invention

According to the present invention, it is able to obtain an ink-jet ink composition for a color filter, which shows excellent straightness and sustainability when ejected from the head, which is able to decrease the heaped amount of the ink and to prevent the ink from overflowing from the ink layer-forming portion, and which is able to form a cured layer with excellent film properties such as heat resistance. By using the ink-jet ink composition for a color filter, it is able to give a pixel formed by the ink-jet method an excellent shape.

The color filter of the present invention is a color filter which has high productivity and pixels having specific colors and showing excellent luminance and excellent contrast, and which is able to realize cost reduction and high yield.

According to the method for producing a color filter of the present invention, the sustainability of the ejection direction and drop mass magnitude of the ink composition is excellent, thereby accurately forming a minute and precise pixel. The thus-obtained pixel has excellent film properties such as heat resistance, adhesion and solvent resistance, while realizing a desired chromaticity. The method of the present invention is a production method using the ink-jet method, so that it is able to realize cost reduction and high yield.

According to the present invention, it is able to provide a high-quality liquid crystal display device with high produc-

DESCRIPTION OF EMBODIMENTS

Figure 1A:
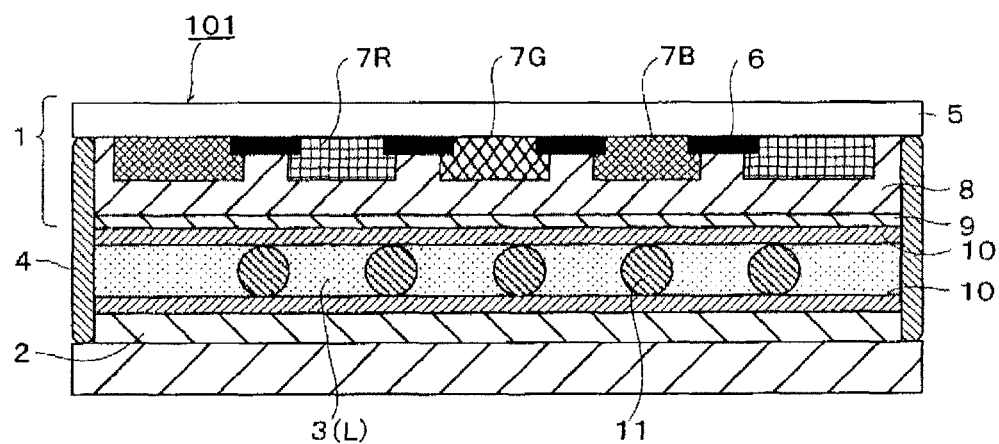
FIG. 1A is a schematic sectional view showing an example of a liquid crystal panel.
Figure 1B:
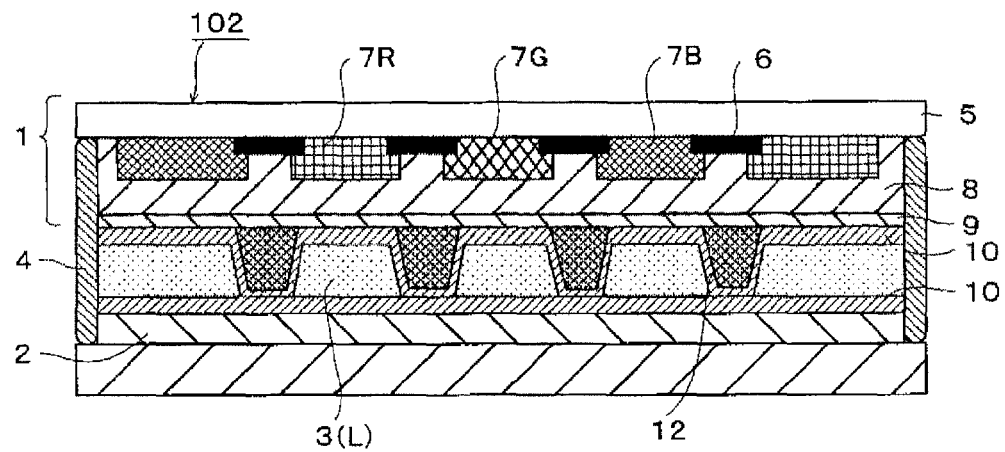
FIG. 1B is a schematic sectional view showing a second example of a liquid crystal panel.

Hereinafter, the present invention will be described in detail.

1. Ink-Jet Ink for Color Filter

The ink-jet ink composition for a color filter of the present invention is an ink-jet ink composition for a color filter comprising: (A) a pigment comprising C.I. pigment blue 15:6 and C.I. pigment violet 23, (B) a pigment dispersing agent comprising a polyallylamine derivative, (C) a thermosetting binder and (D) an organic solvent, wherein the content of C.I. pigment violet 23 is 8 to 30% by weight of the pigment (A).

According to the present invention, in the pigment comprising C.I. pigment blue 15:6 and C.I. pigment violet 23 (A), the content of C.I. pigment violet 23 is larger than ever before so that the content of C.I. pigment violet 23 is 8 to 30% by weight of the pigment (A). As just described, by specifying the amount of C.I. pigment violet 23, it is able to decrease the total amount of the pigment in the solid content, while obtaining the target chromaticity (y=0.075 to 0.122). When it is possible to decrease the total amount of the pigment, it is also possible to decrease the amount of the pigment dispersing agent. As a result, there is no adverse effect on the film properties, which is involved in the increase in the added amount of the pigment dispersing agent, so that it is advantageous in that the pixel is provided with excellent heat resistance. When the pixel has excellent heat resistance, in the process of producing a color filter for example, it is able to prevent the pixel from discoloration or a decrease in luminance or contrast after the post-baking step which is a heating step at 240° C. for 40 minutes, for example.

When it is possible to decrease the total amount of the pigment, it is also possible to increase the solid content of the ink with decreasing the viscosity of the ink composition. As a result, it is possible to decrease the heaped amount (deposited amount) of the ink per unit area in order to color the pixel a desired color. Therefore, it is able to prevent the film of the ink deposited in the ink layer-forming portion formed on the substrate from being broken and prevent the ink from overflowing, so that there is no possibility that the ink is mixed with other color.

Also in the present invention, the pigment comprising C.I. pigment blue 15:6 and C.I. pigment violet 23 (A) is used in combination with the pigment dispersing agent comprising a polyallylamine derivative (B). In this case, the stability of the viscosity of the ink-jet ink composition is excellent, and there is such an advantage that the ink is unlikely to cause a rapid viscosity increase or clogging at the nozzle end of an ink-jet head. In addition, there is an advantage that the pixel formed by depositing the ink by the ink-jet method and cured, is likely to have a narrow film thickness distribution, so that the pixel has an excellent shape. When the pixel has a narrow film thickness distribution and an excellent shape, it is able to increase the luminance and contrast when realizing a specific color.

Hereinafter, the components used for the ink-jet ink composition of the present invention will be described.

((A) Pigment)

The ink-jet ink composition of the present invention is characterized by that it comprises at least C.I. pigment blue 15:6 and C.I. pigment violet 23 as the pigment and the content of C.I. pigment violet is 8 to 30% by weight of the pigment (A). C.I. pigment violet 23 is preferably 30% by weight or less of the pigment (A), more preferably 13% by weight or less of the same, from the viewpoint of achieving the required color properties (especially, a property such that in the CIE XYZ color system of when the coating film of the ink-jet ink composition is subjected to color measurement under illuminant C, the x-coordinate satisfies $0.133 \leq x \leq 0.145$ while the y-coordinate satisfies $0.075 \leq y \leq 0.122$), or from the viewpoint of pigment dispersibility and pigment dispersing stability.

The pigment of the ink-jet ink composition of the present invention can comprise the above two pigments only; however, other pigment(s) can be used appropriately as long as the advantageous effects of the present invention are not deteriorated.

As the other pigment, a desired one can be selected from organic and inorganic colorants for use. Examples of the organic colorants include a dye, an organic pigment and a natural dye. Examples of the inorganic colorants include an inorganic pigment and an extender pigment. Among them, an organic pigment is preferably used since it is able to produce great color and has high heat resistance. Examples of the organic pigment include compounds that are classified into Pigments in the Color Index (C.I.) published by the Society of Dyers and Colourists, in particular, compounds having color index (C.I.) numbers. For example, there may be mentioned blue pigments such as C.I. pigment blue 15:1, C.I. pigment blue 15:2, C.I. pigment blue 15:3, C.I. pigment blue 15:4, C.I. pigment blue 15:5, C.I. pigment blue 16 and C.I. pigment blue 17:1; violet pigments such as C.I. pigment violet 1, C.I. pigment violet 19, C.I. pigment violet 29, C.I. pigment violet 32, C.I. pigment violet 36, C.I. pigment violet 37 and C.I. pigment violet 38; yellow pigments; red pigments; and green pigments.

Specific examples of the inorganic pigment and extender pigment include titanium oxide, barium sulfate, calcium carbonate, zinc oxide, lead sulfate, yellow lead, zinc yellow, red oxide (red iron oxide (III)), cadmium red and amber. In the present invention, the above-mentioned other pigments can be used alone or in combination of two or more.

In the ink-jet ink composition, the pigment is generally 1 to 60% by weight of the total solid content of the ink-jet ink composition. In the present invention, the content of the pigment is preferably 1 to 35% by weight. In the present invention, at least C.I. pigment blue 15:6 and C.I. pigment violet 23 are contained as the pigment, and because the content of the C.I. pigment violet 23 is 8 to 30% by weight of the total pigment, the pigment has high tinting strength. Therefore, it is able to decrease the total amount of the pigment in the solid content to obtain the target chromaticity (for example, y=0.075 to 0.122).

<Particle Diameter of Pigment>

The average particle diameter of the pigment used in the present is only required to be able to provide a desired color when formed into a pixel of a color filter, and it is not particularly limited. However, the average particle diameter is preferably in the range of 10 to 100 nm, more preferably in the range of 30 to 60 nm. When the average particle diameter of the pigment is in the above range, a liquid crystal display device produced with the ink-jet ink composition for a color filter of the present invention, is provided with high contrast and high quality.

The average particle diameter of the pigment is measured by dynamic light scattering and can be measured with a laser scattering particle size distribution analyzer (e.g., MICROTRAC UPA MODEL 9230 manufactured by NIKKISO Co., Ltd.) at 23° C. Herein, "average particle diameter" is a median diameter based on volume.

Also in the ink-jet ink composition of the present invention, when the ink composition is formed into a uniform film by spin coating, etc., having a film thickness of 1.9 μm and showing a value y of 0.105 under illuminant C, the weight ratio of the pigment (P) to the solid content other than the pigment (V) (P/V) is preferably 0.1 to 0.4, particularly preferably 0.15 to 0.3, from the viewpoint of the balance between the ejection performance of the ink, overflowing of the ink, and the film properties of the thus-obtained film. In the ink-jet ink composition, "film thickness of 1.9 μm" means that the average film thickness of the uniform film formed by spin coating for example is 1.9 μm.

When the P/V ratio is too low, to obtain sufficient tinting strength, it is necessary to increase the amount of ink droplets deposited to an pixel-forming region, so that there may be a problem such as overflowing of the ink from the pixel-forming region. On the other hand, when the P/V ratio is too high, there may be a problem such as a decrease in the ejection properties of the ink (for example, clogging at the ejection head, multiple ejections of ink droplets, etc.) and roughened film surface.

In the present invention, at least C.I. pigment blue 15:6 and C.I. pigment violet 23 are contained as the pigment, and because the content of the C.I. pigment violet 23 is 8 to 30% by weight of the total pigment, the pigment has high tinting strength. Therefore, it is able to decrease the P/V ratio of the ink-jet ink. By decreasing the P/V ratio, the viscosity of the ink-jet ink is decreased; therefore, it is able to increase the solid content concentration of the ink-jet ink. As a result, the ink is provided with a viscosity that allows the ink to be ejected and high ejection stability; moreover, it is able to decrease the heaped amount of the ink, so that it is able to prevent the ink from overflowing from the ink-layer forming portion. The solid content of the ink composition for specifying the compounding ratio includes all the components except a solvent, and a binder component in a liquid state is included in the solid content.

((B) Pigment Dispersing Agent)

A pigment dispersing agent is contained in an ink to disperse the pigment sufficiently. The pigment dispersing agent used in the present invention comprises a polyallylamine derivative. When a polyallylamine derivative is used as the pigment dispersing agent, the stability of the viscosity of the ink-jet ink composition is excellent, and there is such an advantage that the ink is unlikely to cause a rapid viscosity increase or clogging at the nozzle end of an ink-jet head. In addition, there is an advantage that the pixel formed by depositing the ink by the ink-jet method and cured, is likely to have a narrow film thickness distribution, so that the pixel has an excellent shape. When the pixel has a narrow film thickness distribution and an excellent shape, it is able to increase the luminance and contrast when realizing a specific color.

Preferably, the polyallylamine derivative used as the pigment dispersing agent of the present invention is a polyallylamine derivative represented by the following formula (I). It is obtained by reacting, for example, a polyallylamine with one or more kinds of compounds selected from the three kinds of compounds of a polyester having a free carboxyl group, a polyamide having a free carboxyl group, and a co-condensation product of ester and amide (polyester amide) having a free carboxyl group.

[Chemical Formula 1]

(I)

wherein each of X and Y is independently a hydrogen, a polymerization initiator residue or a chain transfer catalyst residue; $R^1$ is a free amino group, a group represented by the following formula (II) or a group represented by the following formula (III); n is an integer of 2 to 1,000; of a number "n" of $R^1$s, at least one $R^1$ is a group represented by the following formula (III):

[Chemical Formula 2]

$NH_3^+ \text{-} OCOR^2$ (II)

$NHCOR^2$ (III)

wherein $R^2$ is a residue obtained by removing a carboxyl group from any of a polyester having a free carboxylic acid, a polyamide having a free carboxylic acid, and a polyester amide having a free carboxylic acid.

More specifically, the polyallylamine derivative used in the present invention can be produced from materials such as a polyallylamine having polymerization degree of 2 to 1,000 in combination with one or more kinds of the following: a polyester represented by the following formula (IV); a polyester represented by the following formula (V); a polyamide represented by the following formula (VI) and a polyamide represented by the following formula (VII), all of the polyesters and polyamides having a free carboxyl group:

[Chemical Formula 3]

(IV)

wherein $R^3$ is a straight- or branched-chain alkylene group having 2 to 20 carbon atoms, and a is an integer of 2 to 100;

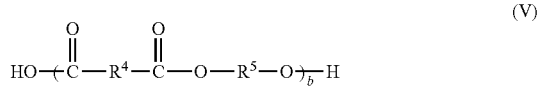

(V)

wherein $R^4$ is a straight- or branched-chain alkylene group having 2 to 20 carbon atoms, $C_6H_4$ or $CH=CH$; $R^5$ is a straight- or branched-chain alkylene group having 2 to 20 carbon atoms or a residue obtained by removing two hydroxyl groups from a polyalkylene glycol; b is an inter of 2 to 100; and an ether bond can be contained in the chain;

[Chemical Formula 5]

(VI)

wherein $R^6$ is a straight- or branched-chain alkylene group having 2 to 20 carbon atoms, and c is an integer of 2 to 100; and

[Chemical Formula 6]

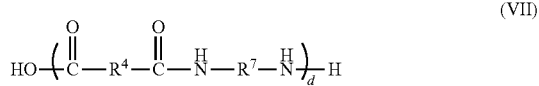

(VII)

wherein $R^4$ is a straight- or branched-chain alkylene group having 2 to 20 carbon atoms, $C_6H_4$ or $CH=CH$; $R^7$ is a straight- or branched-chain alkylene group having 2 to 20 carbon atoms; and d is an integer of 2 to 100.

The polyallylamine derivative used in the present invention can be obtained by reacting a polyallylamine with any of the following: a polyester in which the repeating components of the formulae (IV) and (V) are randomly polymerized; a polyamide in which the repeating components of the formulae (VI) and (VII) are randomly polymerized; and a polyester amide in which the repeating components of the formulae (IV) and/or (V) and those of the formulae (VI) and/or (VII) are randomly polymerized.

The polyallylamine used in the production of the polyallylamine derivative is obtained by polymerizing an allylamine in the presence of a polymerization initiator, or in some cases in the presence of a chain transfer catalyst. The polyallylamine used in the present invention is not particularly limited as long as it has a number average molecular weight of 150 to 100,000. From the viewpoint of pigment dispersibility, preferred is a polyallylamine having a number average molecular weight of 600 to 20,000.

The polyester used in the production of the polyallylamine derivative preferably has a molecular weight of 300 to 20,000. From the viewpoint of pigment dispersibility, preferred is a polyester having a molecular weight of 1,000 to 10,000.

The polyallylamine derivative used in the present invention preferably has a molecular weight of 2,000 to 100,000.

From the viewpoint of pigment dispersibility, preferred as the polyallylamine derivative of the present invention is a polyallylamine derivative produced by the acid amide forming reaction of a polyallylamine having a number "n" of amino groups with 2 mol or more of terminal carboxyl groups of a polyester, polyamide or co-condensation product of an ester and an amide (polyester amide). More preferred is a polyallylamine derivative represented by the formula (I) in which 60 to 95% of a number "n" of $R^1$s are residues connected by the acid amide bond represented by the formula (III). Still more preferred is a polyallylamine derivative represented by the formula (I) in which 65 to 90% of a number "n" of $R^1$s are residues connected by the acid amide bond.

From the viewpoint of pigment dispersibility, the polyallylamine derivative of the present invention is preferably such that the weight ratio of a polyallylamine to a polyester, polyamide or co-condensation product of an ester and an amide (polyester amide), all of which having a carboxyl group at one terminal end, is 1:5 to 1:30, while the thus-obtained polyallylamine derivative has an amine number (mgKOH/g) of 5 to 30.

The pigment dispersing agent comprising the polyallylamine derivative can be a commercial product such as AJISPER Pb821 (manufactured by Ajinomoto Fine-Techno. Co., Inc.)

It is possible to use only the polyallylamine derivative as the pigment dispersing agent. Other pigment dispersing agent can be used together as long as the advantageous effects of the present invention are not deteriorated. As the other pigment dispersing agent, for example, there may be used a cationic surfactant, an anionic surfactant, a nonionic surfactant, an amphoteric surfactant, a silicone-containing surfactant or a fluorine-containing surfactant.

Among surfactants, preferred is a polymeric surfactant having a molecular weight of 1,000 or more. Examples of the polymeric surfactant include: polyoxyethylene alkyl ethers such as polyoxyethylene lauryl ether, polyoxyethylene stearyl ether and polyoxyethylene oleyl ether; polyoxyethylene alkyl phenyl ethers such as polyoxyethylene octyl phenyl ether and polyoxyethylene nonyl phenyl ether; polyethylene glycol diesters such as polyethylene glycol dilaurate and polyethylene glycol distearate; sorbitan fatty acid esters; fatty acid modified polyesters; and tertiary amine modified polyurethanes.

In the ink-jet ink composition of the present invention, generally, the content of the pigment dispersing agent is preferably 5 to 100 parts by weight, more preferably 10 to 80 parts by weight, with respect to the pigment of 100 parts by weight. In the ink-jet ink composition of the present invention, as described above, it is able to decrease the amount of the pigment in the solid content, so that it is able to decrease the amount of the pigment dispersing agent, relatively. Decreasing the amount of the pigment dispersing agent is advantageous in that the thus-obtained colored layer (pixel) is provided with excellent heat resistance. When the colored layer (pixel) has excellent heat resistance, in the process of producing a color filter for example, it is able to prevent the pixel from discoloration or a decrease in luminance or contrast after the post-baking step which is, for example, a heating step at 240° C. for 40 minutes. In the present invention, from the viewpoint of pigment dispersibility, pigment dispersion stability over time, and the heat resistance of the pixel, when the ink composition is formed into a uniform film by spin coating, etc., having a film thickness of 1.9 μm and showing a value y of 0.105 under illuminant C, the content of the pigment dispersing agent (B) is preferably 5 to 20% by weight of the solid content of the ink composition, more preferably 5 to 14% by weight.

(C) Thermosetting Binder

The ink-jet ink composition for a color filter of the present invention contains a binder component to have film-forming ability and adhesion to the surface to which the composition is applied. The ink of the resent invention is an ink that is used in the ink-jet method, so that to form a predetermined pattern, the ink is required to be selectively applied to only a predetermined pattern-forming region and solidified, and it is not necessary to form a pattern by exposure and development. Because of this reason, as the binder component, a thermosetting binder is used to impart sufficient strength, durability and adhesion to a coating film, which makes it possible to polymerize and cure a patterned ink layer (coating film) formed on a substrate by the ink-jet method, by heating. By using a thermosetting binder, the film properties of the pixel are increased further, such as solvent resistance, adhesion and ITO resistance. The ITO resistance is a resistance to defects that can take place when forming an ITO circuit or orientation film, and more specifically, there may be mentioned heat resistance at 230 to 250° C. after forming an ITO circuit. The use of a thermosetting binder is also advantageous in that no special apparatus (e.g., a light exposure device) are necessary and high productivity is obtained.

As the thermosetting binder, a combination of a compound and a curing agent is generally used, the compound having two or more thermosetting functional groups in a molecule thereof, and a catalyst that is able to promote thermosetting reaction can be further added. As the thermosetting functional groups, epoxy resins are preferably used. In addition to them, a polymer which has no polymerization reactivity may be added further.

As the compound having two or more thermosetting functional groups in a molecule thereof, an epoxy compound having two or more epoxy groups in a molecule thereof, is generally used. The epoxy compound having two or more epoxy groups in a molecule thereof is an epoxy compound having in a molecule thereof two or more epoxy groups, preferably 2 to 50 epoxy groups, more preferably 2 to 20 epoxy groups, and examples thereof include one that is referred to as epoxy resin. The epoxy groups are only required to have an oxirane ring structure, such as a glycidyl group, an oxyethylene group and an epoxycyclohexyl group. Examples of the epoxy compound include conventionally known poly-epoxy compounds that can be cured by carboxylic acid. Such epoxy compounds are widely disclosed in, for example, "The epoxy resin handbook" (edited by Masaki Jinbo, published by Nikkan Kogyo Shimbun Ltd. (1987)), and they can be used as the epoxy compound.

i) Compound Having Two or More Thermosetting Functional Groups in a Molecule Thereof.

As the epoxy compound which is a polymer having a relatively high molecular weight and is generally used as the binder component (hereinafter it may be referred to as "binder type epoxy compound"), there may be used a polymer comprising at least a constituent unit represented by the following formula (1) and a constituent unit represented by the following formula (2) and having two or more glycidyl groups:

[Chemical Formula 7]

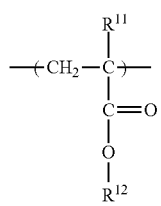

(1)

wherein $R^{11}$ is a hydrogen atom or an alkyl group having to 3 carbon atoms, and $R^{12}$ is a hydrocarbon group having 1 to 12 carbon atoms;

[Chemical Formula 8]

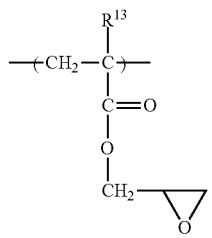

(2)

wherein $R^{13}$ is a hydrogen atom or an alkyl group having 1 to 10 carbon atoms.

The constituent unit represented by the formula (1) is derived from the monomer represented by the following formula (3):

[Chemical Formula 9]

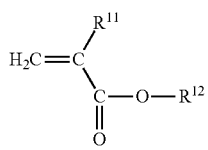

(3)

wherein $R^{11}$ and $R^{12}$ are the same as those in the formula (1).

By using the monomer represented by the formula (3) as the constituent unit of the binder type epoxy compound, sufficient hardness and transparency are provided to the cured coating film comprising the ink-jet ink of the present invention. In the formula (3), $R^{12}$ is a hydrocarbon group having 1 to 12 carbon atoms and can be any of linear aliphatic, alicyclic and aromatic hydrocarbon groups; moreover, it can contain an additional structure such as a double bond, a side chain of a hydrocarbon group, a side chain of a spiro ring and an endocyclic cross-linked hydrocarbon group.

Specific examples of the monomer represented by the formula (3) include methyl(meth)acrylate, ethyl(meth)acrylate, i-propyl(meth)acrylate, n-propyl(meth)acrylate, i-butyl(meth)acrylate, n-ethylhexyl(meth)acrylate, t-butyl(meth)acrylate, 2-ethylhexyl(meth)acrylate, hexyl(meth)acrylate, octyl(meth)acrylate, lauryl(meth)acrylate, cyclohexyl(meth)acrylate, para-t-butyl cyclohexyl(meth)acrylate, isobornyl(meth)acrylate, benzyl(meth)acrylate, dicyclopentenyl(meth)acrylate and phenyl(meth)acrylate.

In the formula (3), $R^{11}$ is preferably a hydrogen or methyl group. $R^{12}$ is preferably an alkyl group having 1 to 12 carbon atoms, and more preferably a methyl group and a cyclohexyl group. Among the monomers represented by the formula (3), preferred are methyl methacrylate (MMA) and cyclohexyl methacrylate (CHMA).

The constituent unit represented by the formula (2) in the polymer is derived from the monomer represented by the formula (4):

[Chemical Formula 10]

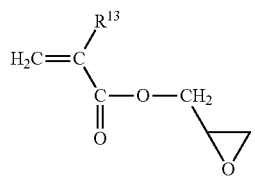

(4)

wherein $R^{13}$ is the same as that in the formula (2).

The monomer represented by the formula (4) is used to introduce the epoxy groups (reactive sites of the epoxy) into the polymer. The ink-jet ink comprising the polymer has excellent storage stability and it is unlikely to cause viscosity increase during storage and ejection. One of the reasons is supposed to be that the epoxy groups in the formula (2) or (4) are glycidyl groups. In the case of using an aliphatic epoxy acrylate instead of the monomer represented by the formula (4), the viscosity of the ink-jet ink is likely to increase.

In the formula (4), $R^{13}$ is preferably a hydrogen or methyl group. As the monomer represented by the formula (4), in particular, there may be mentioned glycidyl(meth)acrylate, and glycidyl methacrylate (GMA) is particularly preferable.

The polymer can be a random copolymer or block copolymer. The polymer can also contain a main chain constituting unit other than the formula (1) or (2) as long as the properties required for the fine parts of a color filter, such as hardness and transparency, are obtained. Specific examples of such a monomer include acrylonitrile and styrene.

In the binder type epoxy compound, the content of the constituent unit represented by the formula (1) and that of the constituent unit represented by the formula (2) is, when expressed in the weight ratio of the monomer which derives the constituent unit represented by the formula (1) to the monomer which derives the constituent unit represented by the formula (2), preferably in the range of 10:90 to 90:10 (the monomer which derives the formula (1): the monomer which derives the formula (2)).

If the amount of the constituent unit represented by the formula (1) exceeds the above ratio 10:90, the number of reactive sites for curing may be decreased, so that crosslinking density could be decreased. If the amount of the constituent unit represented by the formula (2) exceeds the above ratio 90:10, the number of bulky portions of the skeleton of the polymer chain may be decreased, so that the degree of cure shrinkage could be large.

The weight average molecular weight of the binder type epoxy compound is, when expressed as polystyrene-equivalent weight average molecular weight, preferably 3,000 or more, particularly preferably 4,000 or more. This is because, when the molecular weight of the binder type epoxy compound is smaller than 3,000, the physical properties (e.g., strength and solvent resistance) required for the cured layer which is a fine part of the color filter, are likely to be insufficient. On the other hand, the weight average molecular weight of the binder type epoxy compound is, when expressed as polystyrene-equivalent weight average molecular weight, preferably 20,000 or less, particularly preferably 15,000 or less. If the molecular weight is larger than 20,000, viscosity increase is likely to occur, so that the stability of the amount of the ink ejected from the ejection head by the ink-jet method or the straightness of the ejection direction of the same could be deteriorated, or long-term storage stability of the ink could be deteriorated.

As the binder type epoxy compound, it is particularly preferable to use a GMA-MMA copolymer produced by the polymerization of at least glycidyl methacrylate (GMA) and methyl methacrylate (MMA), having a polystyrene-equivalent weight average molecular weight (Mw) in the above. The GMA-MMA copolymer can be one produced by the polymerization of the above two and other monomer component as long as it is able to achieve the objects of the present invention.

An example of the synthesis method of the binder type epoxy compound is as follows: a solvent containing no hydroxyl group is poured into a four-neck flask provided with a thermometer, a reflux condenser, an agitator and a dropping funnel, and the temperature is increased to 120° C. with stirring. The reason of the use of the solvent containing no hydroxyl group is to avoid the epoxy groups being decomposed during the synthesis reaction. Next, a mixture (droplets component) of a polymerization initiator and a composition comprising the monomer represented by the formula (3), the monomer represented by the formula (4) and, as needed, other monomer, is allowed to drip from the dropping funnel for two hours at a constant speed. After the dripping is completed, the temperature of the mixture is increased to 120° C. and a catalyst is added thereto for reaction for three hours. After the temperature of the mixture is increased to 130° C. and kept at the temperature for two hours, the reaction is terminated to obtain the binder type epoxy compound.

As the thermosetting binder of the present invention, there may be used an epoxy compound having two or more epoxy groups in a molecule thereof (hereinafter may be referred to as "polyfunctional epoxy compound"), the compound having a molecular weight that is smaller than that of the binder type epoxy compound. As described above, it is particularly preferably to use the binder type epoxy compound in combination with the polyfunctional epoxy compound. In this case, the polystyrene-equivalent weight average molecular weight of the polyfunctional epoxy compound is preferably 4,000 or less, more preferably 3,000 or less, based on the condition that it is smaller than that of the binder type epoxy compound to be combined therewith.

Since the epoxy groups (glycidyl groups) are introduced into the binder type epoxy compound by the constituent unit represented by the formula (2), the epoxy amount that is allowed to be introduced into the molecule of the copolymer is limited. When a polyfunctional epoxy compound having a relatively small molecular weight is added to the ink-jet ink, the ink is supplemented with epoxy groups, so that the reaction site concentration of the epoxy is increased, thus increasing the crosslinking density.

Of polyfunctional epoxy compounds, to increase the crosslinking density of the acid-epoxy reaction, an epoxy compound having four or more epoxy groups in a molecule thereof is preferably used. Especially in the case where the binder type epoxy compound has a weight average molecular weight of 10,000 or less to increase the ejection performance of the ink when being ejected from the ejection head employing the ink-jet method, the strength and hardness of the cured layer is likely to decrease. Therefore, it is preferable to add such a polyfunctional (tetrafunctional or more) epoxy compound to the ink-jet ink to sufficiently increase the crosslinking density.

There is no particular limitation on epoxy compounds that can be used as the polyfunctional epoxy compound, as long as they have two or more epoxy groups in a molecule thereof. Examples thereof include a bisphenol A type epoxy resin, a bisphenol F type epoxy resin, a brominated bisphenol A type epoxy resin, a bisphenol S type epoxy resin, a diphenylether type epoxy resin, a hydroquinone type epoxy resin, a naphthalene type epoxy resin, a biphenyl type epoxy resin, a fluorene type epoxy resin, a phenol novolac type epoxy resin, an orthcresol novolac type epoxy resin, a trishydroxyphenylmethane type epoxy resin, a trifunctional epoxy resin, a tetraphenylolethane type epoxy resin, a dicyclopentadiene phenol type epoxy resin, a hydrogenerated bisphenol A type epoxy resin, polyol-containing bisphenol A type epoxy resin, a polypropylene glycol type epoxy resin, a glycidyl ester type epoxy resin, a glycidyl amine type epoxy resin, a glyoxal type epoxy resin, an aliphatic epoxy resin and an heterocyclic epoxy resin.

More specifically, there may be mentioned bisphenol A type epoxy resin such as Epikote828 (product name, manufactured by Japan Epoxy Resins Co., Ltd.), a bisphenol F type epoxy resin such as YDF-175S (product name, manufactured by Tohto Kasei Co., Ltd.), a brominated bisphenol A type epoxy resin such as YDB-715 (product name, manufactured by Tohto Kasei Co., Ltd.), a bisphenol S type epoxy resin such as EPICLON EXA1514 (product name, manufactured by Dainippon Ink and Chemicals Inc.), a hydroquinone type epoxy resin such as YDC-1312 (product name, manufactured by Tohto Kasei Co., Ltd.), a naphthalene type epoxy resin such as EPICLON EXA4032 (product name, manufactured by Dainippon Ink and Chemicals Inc.), a biphenyl type epoxy resin such as Epikote YX4000H (product name, manufactured by Japan Epoxy Resins Co., Ltd.), a bisphenol A type novolac epoxy resin such as Epikote 157S70 (product name, manufactured by Japan Epoxy Resins Co., Ltd.), a phenolic novolac type epoxy resin such as Epikote 154 (product name, manufactured by Japan Epoxy Resins Co., Ltd.) and YDPN-638 (product name, manufactured by Tohto Kasei Co., Ltd.), a cresol novolac type epoxy resin such as YDCN-701 (product name, manufactured by Tohto Kasei Co., Ltd.), a dicyclopentadiene phenol type epoxy resin such as EPICLON HP-7200 (product name, manufactured by Dainippon Ink and Chemicals Inc.), a trishydroxyphenylmethane type epoxy resin such as Epikote 1032H60 (product name, manufactured by Japan Epoxy Resins Co., Ltd.), a trifunctional epoxy resin such as VG3101M80 (product name, manufactured by Mitsui Chemicals, Inc.), a tetraphenylolethane type epoxy resin such as Epikote 1031S (product name, manufactured by Japan Epoxy Resins Co., Ltd.), a tetrafunctional epoxy resin such as DENACOL EX-411 (product name, manufactured by Nagase Chemicals Ltd.), a hydrogenated bisphenol A type epoxy resin such as ST-3000 (product name, manufactured by Tohto Kasei Co., Ltd.), a glycidyl ester type epoxy resin such as Epikote 190P (product name, manufactured by Japan Epoxy Resins Co., Ltd.), a glycidyl amine type epoxy resin such as YH-434 (product name, manufactured by Tohto Kasei Co., Ltd.), a glyoxal type epoxy resin such as YDG-414 (product name, manufactured by Tohto Kasei Co., Ltd.), an aliphatic polyfunctional epoxy compound such as EPOLEAD GT-401 (product name, manufactured by DAICEL Chemical Industries, Ltd.), and a heterocyclic epoxy resin such as triglycidyl isocyanate (TGIC). As needed, as a diluent having epoxy reactivity, NEOTOHTO E (product name, manufactured by Tohto Kasei Co., Ltd.) can be mixed therewith.

Among the polyfunctional epoxy compounds, particularly preferred are a bisphenol A type novolac epoxy resin such as Epikote 157S70 (product name, manufactured by Japan Epoxy Resins Co., Ltd.) and a cresol novolac type epoxy resin such as YDCN-701 (product name, manufactured by Tohto Kasei Co., Ltd.)

<Compounding Ratio of Epoxy Compound>

The compounding ratio of the binder type epoxy compound to the polyfunctional epoxy compound which is added as needed, is preferably the binder type epoxy compound of 10 to 80 parts by weight to the polyfunctional epoxy compound of 10 to 60 parts by weight, more preferably the binder type epoxy compound of 20 to 60 parts by weight to the polyfunctional epoxy compound of 20 to 50 parts by weight, and particularly preferably the binder type epoxy compound of 30 to 40 parts by weight to the polyfunctional epoxy compound of 25 to 35 parts by weight as weight ratio.

ii) Curing Agent

The thermosetting binder used in the present invention is normally mixed with a curing agent. As the curing agent, a polyvalent carboxylic anhydride or polycarboxylic acid is used, for example.

Specific examples of the polyvalent carboxylic acid include aliphatic or alicyclic dicarboxylic anhydrides such as a phthalic anhydride, itaconic anhydride, succinic anhydride, citraconic anhydride, dodecenyl succinic anhydride, tricarballylic anhydride, maleic anhydride, hexahydrophthalic anhydride, dimethyltetrahydrophthalic anhydride, himic anhydride and nadic anhydride; aliphatic polycarboxylic dianhydrides such as a 1,2,3,4-butanetetracarboxylic dianhydride and cyclopentanetetracarboxylic dianhydride; aromatic polycarboxylic anhydrides such as a pyromellitic dianhydride, trimellitic anhydride and benzophenonetetracarboxylic anhydride; and ester group-containing acid anhydrides such as an ethylene glycol bistrimellitate and glycerin tristrimellitate. Particularly preferred are aromatic polycarboxylic anhydrides. Commercially-available epoxy resin curing agents comprising a carboxylic anhydride are also suitable for use.

Specific examples of the polycarboxylic acid include aliphatic polycarboxylic acids such as a succinic acid, glutaric acid, adipic acid, butanetetracarboxylic acid, maleic acid and itaconic acid; aliphatic polycarboxylic acids such as a hexahydrophtalic acid, 1,2-cyclohexanedicarboxylic acid, 1,2,4-cyclohexanetricarboxylic acid and cyclopentanetetracarboxylic acid; aromatic polycarboxylic acids such as a phthalic acid, isophthalic acid, terephthalic acid, pyromellitic acid, trimellitic acid, 1,4,5,8-naphthalenetetracarboxylic acid and benzophenonetetracarboxylic acid. Preferred are aromatic polycarboxylic acids.

These curing agents can be used alone or in combination of two or more kinds. The amount of the curing agent used in the present invention is normally in the range of 1 to 100 parts by weight, preferably 5 to 50 parts by weight, with respect to the epoxy group-containing components (the binder type epoxy compound and the polyfunctional epoxy compound) of 100 parts by weight. If the amount of the curing agent is less than part by weight, the curing may be insufficient, so that a strong coating film could not be formed. If the amount of the curing agent exceeds 100 parts by weight, the adhesion of the resulting coating film to a substrate could be poor.

iii) Catalyst

To increase the hardness and heat resistance of the cured layer, a catalyst can be added to the thermosetting binder of the present invention, which is able to promote the thermosetting reaction between acid and epoxy. As such a catalyst, a thermally latent catalyst which shows activity when cured by heating, can be used.

A thermally latent catalyst exhibits catalytic activity when heated and thus promotes curing reaction to provide excellent physical properties to a cured product; moreover, it is added as needed. The thermally latent catalyst used in the present invention is preferably one that exhibits acid catalytic activity at a temperature of 60° C. or more. Examples of such a catalyst include a compound produced by neutralization of a protonic acid with a Lewis base, a compound produced by neutralization of a Lewis acid with a Lewis base, a mixture of a Lewis acid and a trialkyl phosphate, sulfonic esters and onium compounds. Also, there may be used various kinds of compounds as disclosed in JP-A No. H04-218561. In particular, for example, there may be mentioned (a) compounds produced by neutralization of halogenocarboxylic acids, sulfonic acids, phosphoric acids and diesters with amines such as ammonium, monomethylamine, triethylamine, pyridine and ethanolamine, or trialkylphosphine, etc.; (b) compounds produced by neutralization of Lewis acids such as $BF_3$, $FeCl_3$, $SnCl_4$, $AlCl_3$ and $ZnCl_2$ with the above-mentioned Lewis base; (c) ester compounds comprising a combination of a methanesulfonic acid, an ethanesulfonic acid, a benzenesulfonic acid, and so on with a primary or secondary alcohol; and (d) phosphoric monoester compounds and phosphoric diester compounds of primary and secondary alcohols. Examples of the onium compounds include ammonium compounds ($[R_3NR']^+X^-$), sulfonium compounds ($[R_3SR']^+X^-$) and oxonium compounds ($[R_3OR']^+X^-$), wherein each of R and R' is alkyl, alkenyl, aryl, alkoxy or the like.

The amount of the thermally latent catalyst is normally 0.01 to 10.0 parts by weight with respect to a total of the curing agent and the compound having two or more thermosetting functional groups in a molecule thereof, of 100 parts by weight.

(D) Organic Solvent

The ink composition of the present invention contains (D) an organic solvent so that the composition can be made into a high-concentration solution or an ink that can be ejected immediately from the head. The organic solvent (D) is not particularly limited as long as it is a solvent that is able to appropriately dissolve or disperse the solid content to make the ink composition into a high-concentration ink that can be stored for long periods or an ink that can be applied immediately.

As the main solvent, the ink-jet ink composition of the present invention preferably contains a solvent component having a boiling point of 180° C. to 260° C., particularly 210° C. to 260° C., and a vapor pressure at normal temperature (especially in the range of 18° C. to 25° C.) of 0.5 mmHg (66.7 Pa) or less, particularly 0.1 mmHg (13.3 Pa) or less, in an amount of preferably 80% by weight or more, particularly preferably 85% by weight or more, with respect to the total amount of the organic solvent (D), so that the ink causes no rapid viscosity increase or no clogging and improve its ejection performance without affecting the straightness and sustainability of the ejection direction. When the ejection performance is increased, it is able to form a colored cured layer accurately and uniformly. The main solvent preferably has a surface tension of 28 mN/m or more, so that it is able to prevent the ink from flowing to ink-philic and ink-phobic portions during patterning. In the present invention, the surface tension at 23° C. can be measured with a surface tensiometer (using the Wilhelmy method) such as CBVP-Z (an automatic surface tensiometer manufactured by Kyowa Interface Science Co., Ltd.)

As the solvent used for the ink-jet ink composition of the present invention, the composition preferably contains the following: a solvent component (the first solvent) having a boiling point of 180° C. to 260° C., preferably 210° C. to 260° C. and a vapor pressure at normal temperature (especially in the range of 18° C. to 25° C.) of 0.5 mmHg or less, preferably 0.1 mmHg or less, in an amount of 60 to 95% by weight with respect to the total amount of the whole solvent; and another solvent component (the second component) having a boiling point of 130° C. or more and less than 180° C. in an amount of 5 to 40% by weight with respect to the total amount of the whole solvent. In this case, in addition to exhibiting excellent ejection performance, the ink is able to prevent rapid drying at the nozzle end of an ink-jet head; moreover, it is able to prevent the solute from flowing when drying the ink layer and to control the drying speed appropriately. Therefore, it is able to obtain a pattern with high film thickness uniformity, in which a thick portion is unlikely to be produced at the edge of the coating film and which has reduced surface unevenness; moreover, it is able to dry the pattern efficiently.

The amount of the first solvent is preferably 70 to 95% by weight of the total amount of the whole solvent, more preferably 75 to 95% by weight of the total amount of the whole solvent, still more preferably 80 to 92% by weight of the total amount of the whole solvent. The ink-jet ink of the present invention can additionally contain a solvent component other than the first and second solvent components as needed as long as it is used in a small amount. This is because the ink of the present invention contains a pigment as the colorant, so that to produce a pigment dispersion, it is sometimes necessary to use a dispersion solvent in which solvents are easily dispersed.

The main solvent or the first solvent is selected from the following solvents: glycol ethers such as an ethylene glycol monohexyl ether and diethylene glycol monomethyl ether; glycol ether esters such as an ethylene glycol monobutyl ether acetate and diethylene glycol monomethyl ether acetate; aliphatic carboxylic acids or anhydrides thereof, such as an acetic acid, 2-ethylhexanoic acid and acetic anhydride; aliphatic or aromatic esters such as an ethyl acetate and propyl benzoate; dicarboxylic acid diesters such as a diethyl carbonate; alkoxycarboxylic acid esters such as a methyl 3-methoxy propionate; ketocarboxylic acid esters such as an ethyl acetoacetate; halogenocarboxylic acids such as a chloroacetic acid and dichloroacetic acid; alcohols or phenols such as an ethanol, isopropanol and phenol; aliphatic or aromatic ethers such as a diethyl ether and anisole; alkoxy alcohols such as a 2-ethoxy ethanol and 1-methoxy-2-propanol; glycol oligomers such as a diethylene glycol and tripropylene glycol; amino alcohols such as a 2-diethyl amino ethanol and triethanolamine; alkoxy alcohol esters such as a 2-ethoxy ethyl acetate; ketones such as an acetone and methyl isobutyl ketone; morpholines such as N-ethyl morpholine and phenyl morpholine; aliphatic or aromatic amines such as a pentylamine, tripentylamine and aniline.

Specific examples of the solvent which can be used as the main solvent or the first solvent include an ethylene glycol monobutyl ether acetate, diethylene glycol monobutyl ether acetate, diethylene glycol monoethyl ether acetate, diethylene glycol dibutyl ether, diethyl adipate, dibutyl oxalate, dimethyl malonate, diethyl malonate, dimethyl succinate and diethyl succinate. These solvents meet the requirement of a boiling point of 180° C. to 260° C. and a vapor pressure at normal temperature of 0.5 mmHg or less; moreover, they have relatively excellent pigment dispersibility and dispersion stability, so that they can be mixed with a solvent that is conventionally used for production of a pigment dispersion, such as 3-methoxybutyl acetate or propylene glycol monomethyl ether acetate (PGMEA), thereby producing a pigment dispersion. Alternatively, they can be used solely as the dispersion solvent, thereby producing a pigment dispersion.

The solvents mentioned above as the specific examples meets the following requirement: the contact angle to the surface of a test specimen having a critical surface tension of 30 mN/m is 25° or more, the tension is found in a Zisman plotting graph using a standard liquid specified in the wettability test defined in JIS K6768 and measuring contact angle (θ) 30 seconds after contact with a liquid droplet. Moreover, the contact angle to the surface of a test specimen having a critical surface tension of 70 mN/m is 10° or less, the tension being obtained by the same measurement method. Therefore, it is able to use the above solvents as the main or primary solvent even in the case where the a wettability-variable layer is formed on a surface of a substrate and exposed to light to selectively deposit the ink using the difference between the wettability of an exposed portion and that of an unexposed portion.

The solvent component used as the second solvent is one having a boiling point of 130° C. or more and less than 180° C. As the second solvent, it is able to use one solvent or two or more kinds of solvents as long as they have such a boiling point.

The boiling point of each solvent component used for the second solvent is more preferably 140° C. to 180° C., particularly preferably 140° C. to 175° C., from the point of view that it is easy to obtain an excellent coating film in which a thick portion is unlikely to be produced at the edge of the coating film and which has reduced surface unevenness.

The second solvent preferably has a viscosity of 0.5 to 6 mPa·s at 23° C. In this case, by using the second solvent, it is able to decrease the viscosity of the ink appropriately, without inhibiting the effects of the first solvent. As a result of increasing the wetting and spreading properties of the ink, the ink droplet impacted onto the ink layer-forming region is likely to wet and spread all over the region. As a result, the ink is able to wet and spread into the edge of the light-shielding member and thus is able to prevent pixels from color missing and decrease in luminance, thereby obtaining a color filter with less display defects. To attach the ink to the corner of the region, a method of discharging the ink to the edge of the region can be employed. In this method, however, the ink could flow out through the gap of the light-shielding member. However, as described above, allowing the ink to wet and spread all over the edge of the light-shielding member, has no possibility of ink outflow, so that it is a desirable method also from the viewpoint of preventing mixing of two or more kinds of inks in different colors used together. The viscosity of the second solvent at 23° C. is more preferably 0.5 to 3 mPa·s. When the second solvent comprises a mixture of two or more kinds of solvents, even though the viscosity of one solvent is out of the range, if the viscosity of the mixed solvent is in the range, the mixed solvent is suitably used. In the present invention, the viscosity at 23° C. can be measured with a falling-ball viscometer such as AMVn (product name, an automated micro viscometer manufactured by NIHON SIBERHEGNER K.K.)

The second solvent is required to have the above-mentioned boiling point and it is preferable to appropriately select and use a solvent which is superior in compatibility with the first solvent.

Specific examples of the second solvent include polyalcohol ethers such as glycerin ethers including glycerol 1,3-dimethyl ether and glycol ethers including ethylene glycol monoethyl ether, ethylene glycol monopropyl ether, ethylene glycol monoisopropyl ether, ethylene glycol monobutyl ether, ethylene glycol dipropyl ether, propylene glycol monoethyl ether, propylene glycol monopropyl ether, propylene glycol monobutyl ether, diethylene glycol methyl ethyl ether, diethylene glycol dimethyl ether, dipropylene glycol dimethyl ether; polyalcohol esters such as glycerin esters including glycerin 1-monoacetate and glycol esters including glycol ether esters such as ethylene glycol monomethyl ether acetate, ethylene glycol monoethyl ether acetate, ethylene glycol monopropyl ether acetate, ethylene glycol monomethoxy methyl ether, propylene glycol monomethyl ether acetate and propylene glycol monoethyl ether acetate; carboxylic acids such as isovaleric acid, isobutyric acid, propionic acid and butyric acid; aliphatic esters such as ethyl isovalerate, hexyl formate, amyl acetate, isoamyl acetate, cyclohexyl acetate, ethyl lactate, methyl lactate, isoamyl propionate, butyl propionate, butyl butyrate, tributyl citrate and dimethyl oxalate; alkoxycarboxylic acid esters such as ethyl 3-ethoxypropionate; ketocarboxylic acid esters such as methyl acetoacetate; monovalent alcohols such as n-amyl alcohol, isoamyl alcohol, 2-ethyl butanol, glycidol, n-hexanol, 2-methylcyclohexanol, 4-methyl-2-pentanol, 2-octanol, cyclohexanol, 2-heptanol, 3-heptanol and n-heptanol; ethers such as diisoamyl ether and 1,8-cineole; ketones such as ethyl-n-butyl ketone, diisobutyl ketone, di-n-propyl ketone, methylcyclohexanone, methyl-n-hexyl ketone, acetylacetone and diacetone alcohol; alkanes such as nonane and decane.

It is especially preferable to use one or more kinds selected from the group consisting of ethers including polyalcohol ethers such as glycol ethers and glycerin ethers, polyalcohol esters including glycol esters and glycerin ester, and esters including aliphatic esters, alkoxycarboxylic acid esters and ketocarboxylic acid esters. Use of the above-mentioned esters and/or ethers is advantageous in that the ink is able to keep excellent stability over time and shows improved ejection stability from the ink-jet head even when using resin having high reactivity as a binder component, etc. Use of glycol ethers and/or glycol esters increases the wettability of the ink with glass substrates and makes the ink easy to wet and spread all over the ink layer-forming region, thereby being effective in preventing color missing pixels.

Suitably used as the second solvent is a solvent comprising one or more kinds selected from the group consisting of, especially, ethylene glycol monoethyl ether, ethylene glycol monopropyl ether, ethylene glycol monoisopropyl ether, ethylene glycol monobutyl ether, propylene glycol monoethyl ether, propylene glycol monopropyl ether, propylene glycol monobutyl ether, diethylene glycol methyl ethyl ether, diethylene glycol dimethyl ether, dipropylene glycol dimethyl ether, glycerol 1,3-dimethyl ether, ethylene glycol monomethyl ether acetate, ethylene glycol monoethyl ether acetate, ethylene glycol monopropyl ether acetate, ethylene glycol monomethoxy methyl ether, propylene glycol monomethyl ether acetate, methyl acetoacetate, hexyl formate, cyclohexyl acetate, ethyl lactate, isoamyl propionate, butyl propionate, butyl butyrate, tributyl citrate, dimethyl oxalate, ethyl 3-ethoxypropionate, diisoamyl ether and 1,8-cineole.

In the ink-jet ink for a color filter of the present invention, the content of the second solvent is preferably 5 to 30% by weight, more preferably 5 to 25% by weight, particularly preferably 8 to 20% by weight, with respect to the total solvent, from the point of view that the ink shows excellent ejection stability when ejected from the ink-jet head and can be dried efficiently without inhibiting the effects of the first solvent; moreover, it is easy to obtain an excellent pixel or the like in which a thick portion is unlikely be produced at the edge and which has reduced surface unevenness.

The solvent as described above is used in an amount of normally 40 to 95% by weight of the total amount of the ink which contains the solvents, thereby producing the ink. To produce an ink that can be ejected immediately from the head, the solvents are appropriately controlled to have a viscosity that is appropriate for ejection from the ink-jet head. If the content of the solvents is too small, the ink viscosity is high and thus it is difficult to eject the ink from the ink-jet head. If the content of the solvents is too large, when the heaped amount (deposited amount) of the ink deposited on a predetermined wettability-varied portion (ink layer-forming portion) is not sufficient, the film of the ink deposited on the wettability-varied portion is broken, so that the ink overflows to the surrounding unexposed portion and also to an adjacent wettability-varied portion (ink layer-forming portion). In other words, the heaped amount of the ink capable of being deposited on the wettability-varied portion (ink layer-forming portion) without allowing the ink to overflow, becomes insufficient, so that the thickness of the layer is too thin after drying, thereby failing to obtain sufficient transmission density.

To produce an ink that can be ejected immediately from the head, the solid content concentration is 15 to 25% by weight, preferably 18 to 22% by weight of the total weight of the ink-jet ink for a color filter. If the solid content concentration is too low, it is needed to increase the amount of ink to be applied to pixels, which is problematic in that the ink overflows upon patterning. On the other hand, if the solid content concentration is too high, there may be a problem such as a decrease in the ejection properties of the ink (for example, clogging at the ejection head, multiple ejections of ink droplets, etc.)

(Other Components)

The ink-jet ink for a color filter of the present invention can contain one or more kinds of other additives as needed. Examples of such additives are as follows:

a) Filler: glass, alumina, etc.

b) Adhesion enhancing agent: vinyl trimethoxy silane, vinyl triethoxy silane, vinyl tris(2-methoxyethoxy) silane, N-(2-aminoethyl)-3-aminopropyl methyl dimethoxy silane, etc.

c) Leveling agent: acrylic surfactant, fluorine-containing surfactant, silicone-containing surfactant, vinyl ether surfactant, etc.

d) Ultraviolet absorbing agent: 2-(3-t-butyl-5-methyl-2-hydroxyphenyl)-5-chlorobenzotriazole, alkoxyl benzophenone, etc.

e) Aggregation inhibitor: sodium polyacrylate, etc.

(Method for Producing Ink-Jet Ink Composition)

The ink-jet ink composition for a color filter of the present invention can be produced by adding the components to a simple or mixed solvent and mixing them to dissolve or disperse the solid components.

However, the pigment is likely not to be dispersed sufficiently in the solvent when the pigment is directly added to the entire solvent together with other components (e.g., binder) and stirred and mixed. In general, therefore, a solvent with excellent pigment dispersibility and dispersion stability is provided, and the pigment is added thereto together with the pigment dispersing agent and stirred sufficiently with a dissolver for example to produce a pigment-dispersed liquid. The thus-obtained pigment-dispersed liquid is, together with components other than the pigment, added to a solvent which, for example, mostly comprises the first solvent or which comprises the first solvent only. The mixture is sufficiently stirred and mixed with a dissolver for example. Finally, the second solvent is added thereto as needed, thereby producing an ink-jet ink used for the present invention. Alternatively, the thus-obtained pigment-dispersed liquid is, together with components other than the pigment, added to a mixed solvent produced by mixing a solvent which mostly comprises the first solvent or which comprises the first solvent only with the second solvent. The mixture is sufficiently stirred and mixed with a dissolver for example, thereby producing an ink-jet ink used for the present invention.

The rest of the solvent to which the pigment-dispersed liquid is added may be one having a composition that is obtained by deducting the composition of the solvent used for the production of the pigment-dispersed liquid from the composition of the finally-obtained entire solvent, and it may be diluted to a final concentration to achieve an ink-jet ink. Or, the pigment-dispersed liquid can be added to a relatively small amount of main solvent to produce a highly-concentrated ink-jet ink. The highly-concentrated ink-jet ink can be stored as it is and diluted to the final concentration when it is used in the ink-jet method.

(Physical Properties of Ink-Jet Ink Composition)

To produce an ink that can be immediately ejected from the head, the ink-jet ink composition of the present invention preferably has a viscosity of 5 to 11 mPa·s at 23° C., preferably 5 to 10.5 mPa·s, in light of ejection properties from the ink-jet head and ejection stability. The viscosity can be measured by a falling-ball viscometer such as AMVn (product name, an automated micro viscometer manufactured by NIHON SIBERHEGNER K.K.)

Also in the ink-jet ink composition of the present invention, when measured with a laser scattering particle size distribution analyzer, the pigment (A) preferably has an average dispersed particle diameter of 10 to 100 nm, from the point of view that there is an increase in pigment dispersibility and pigment dispersion stability over time and a color filter produced with the ink-jet ink composition shows increased luminance and contrast. Especially, the average dispersed particle diameter of the pigment (A) is particularly preferably 30 to 60 nm. The average dispersed particle diameter of the pigment can be measured by appropriately diluting the ink composition with the main solvent used for the ink composition (the first solvent) to a concentration that can be measured with a laser scattering particle size distribution analyzer, such as a concentration that is 100 times the original concentration, and then measuring by dynamic light scattering with a laser scattering particle size distribution analyzer (for example, MICROTRAC UPA MODEL9230 manufactured by NIKKISO Co., Ltd.) at 23° C. Herein, "average particle diameter" is a median diameter based on volume.

(Physical Properties of Cured Layer of Ink-Jet Ink Composition)

Figure 6:
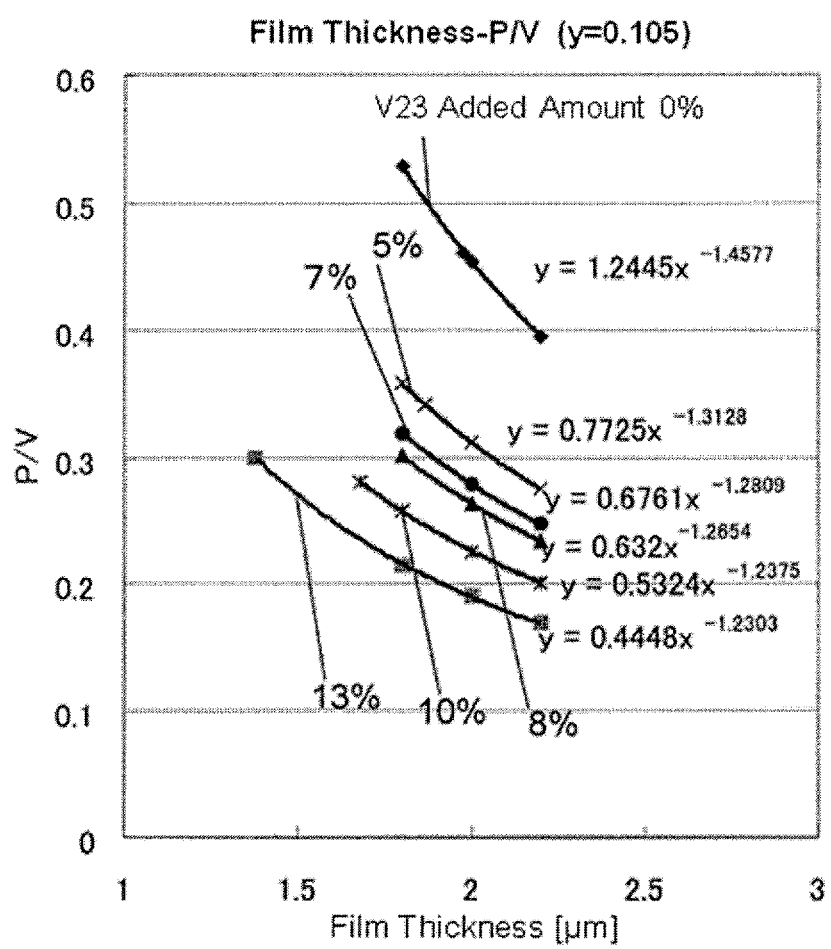
FIG. 6 is a graph showing an example of the relationship of the formula $Y=aX^b$ in which, when value y obtained under illuminant C is 0.105, horizontal axis X means film thickness and vertical axis Y means the weight ratio (P/V) of a pigment to the solid content other than the pigment.

The ink-jet ink for a color filter of the present invention is preferably such that when the ink is formed into a uniform film and the film is cured to form a cured layer showing a value y of 0.105 under illuminant C, in the relationship of the formula $Y=aX^b$ in which horizontal axis X means the film thickness and vertical axis Y means the weight ratio of the pigment (A) to the solid content other than the pigment (A) (P/V), a is in the range of $0.40<a<0.64$ and b is in the range of $-1.27<b<-1.20$, from the point of view that it is able to set the ratio of the pigment and the solid content other than the pigment (P/V) low. A graph is shown in FIG. 6, which shows an example of the relationship of $Y=aX^b$.

2. Color Filter

The color filter of the present invention is a color filter comprising a transparent substrate and a pixel provided thereon, wherein the pixel thickness is not uniform in the region of the pixel; at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A).

When a pixel is formed by ink-jet method in a region that is surrounded by the light-shielding members on the transparent substrate, the pixel thickness is not uniform in the region of the pixel. In particular, when a pixel is formed by the ink-jet method in a region surrounded by the light-shielding member on the transparent substrate, due to reasons such as the affinity of the ink for the light-shielding member, the height of the light-shielding member and the amount of the ejected ink, the shape of the pixel in the opening surrounded by the light-shielding members may be such that the pixel has a portion of small thickness in the periphery of the pixel or along the vicinity of the periphery and a portion of the maximum thickness in the part which is closer to the center of the pixel than the portion of small thickness. Or, conversely, the shape may be such that the pixel has a portion of large thickness in the periphery of the pixel or along the vicinity of the periphery and a portion of the minimum thickness in the part which is closer to the center of the pixel than the portion of large thickness. Moreover, the pixel surface may have a convex and concave shape.

In the color filter of the present invention, at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A). Therefore, even when the pixel has a shape with, as with a pixel produced by ink-jet method, non-uniform thickness as mentioned above, it is provided with excellent heat resistance while realizing a specific color, so that it is able to prevent the pixel from discoloration or a decrease in luminance and contrast. In the blue pixel of the color filter of the present invention, a pigment dispersing agent comprising a polyallylamine derivative is used, so that although the thickness of the pixel is not uniform, the pixel is able to have a good shape with a relatively small difference in thickness.

Figure 2:
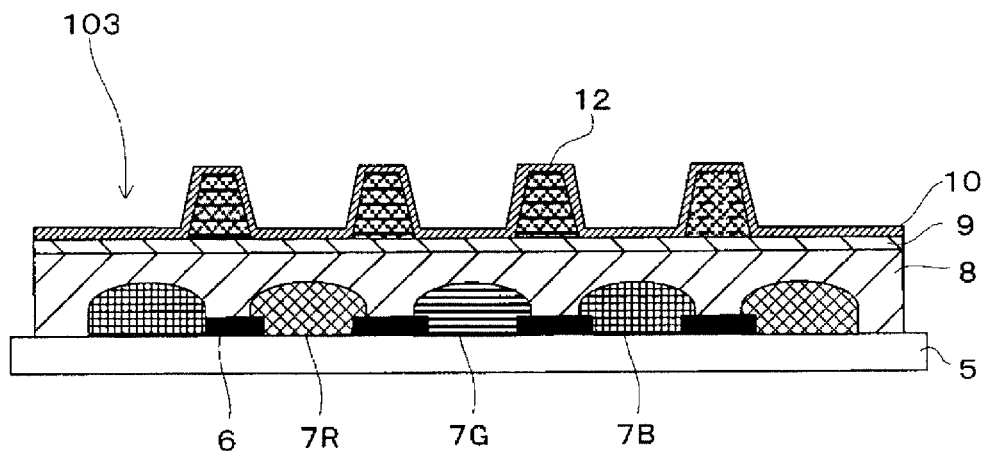
FIG. 2 is a schematic vertical sectional view showing an example of the color filter according to the present invention.

FIG. 2 is a vertical sectional view showing an example of the color filter (color filter 103) of the present invention. The color filter 103 comprises a light-shielding member 6 formed in a predetermined pattern on a transparent substrate 5, a pixel 7 (7R, 7G and 7B) formed in a predetermined pattern on the light-shielding members 6, and a protecting film 8 formed to cover the pixels. A transparent electrode film 9 for driving liquid crystal is formed on the protecting film 8. The protecting film 8 is not indispensable. An orientation film 10 is formed on the innermost surface of the color filter 103 (in this case, on the transparent electrode).

A columnar spacer 12 is a kind of convex spacer and formed in predetermined regions (four regions in FIG. 2) on the transparent electrode 9 in accordance with the regions where the light-shielding members 6 are formed (non-display regions). The columnar spacer 12 is formed on the transparent electrode 9, pixel 7 or protecting film 8. In a color filter 102, the columnar spacers are formed on the protecting film 8 via the transparent electrode film 9 in a sea-island form; however, it is also possible that the protecting film 8 and columnar spacers 12 are formed integrally and the transparent electrode film 9 is formed to cover them. If the color filter has no light-shielding members, a columnar spacer can be formed in the region where no pixel is formed.

(Transparent Substrate)

The transparent substrate 5 is not particularly limited as long as it is a material that has been used for a color filter. For example, there may be used a transparent rigid material having no flexibility such as quartz glass, Pyrex (trade name) glass and synthetic quartz glass or a transparent flexible material such as a transparent resin film and optical resin plate. Among them, 7059 glass manufactured by Corning Incorporated is suitable for a color filter for an active matrix color liquid crystal display device because it is a material with a small thermal expansion coefficient and has excellent dimensional stability and excellent workability upon heat treatment at high temperature; moreover, it is a non-alkali glass containing no alkaline component therein. In the present invention, a transparent substrate is generally used; however, it is also possible to use a reflective substrate or a white-colored substrate. The substrate can be a substrate that was subjected to a surface treatment as needed for the purpose of preventing alkali dissolution, imparting gas barrier properties, etc.

(Pixel)

As described above, the pixel of the color filter of the present invention is characterized in that the pixel thickness is not uniform in the region of the pixel. The shape of the pixel of the present invention may be such that the pixel has a portion of small thickness in the periphery of the pixel or along the vicinity of the periphery and a portion of the maximum thickness in the part which is closer to the center of the pixel than the portion of small thickness. Or, conversely, the shape may be such that the pixel has a portion of large thickness in the periphery of the pixel or along the vicinity of the periphery and a portion of the minimum thickness in the part which is closer to the center of the pixel than the portion of large thickness. Moreover, the pixel surface may have a convex and concave shape. The "periphery" of the pixel is an edge that defines the planar shape of the pixel. "In the periphery of the pixel or along the vicinity of the periphery" means that the pixel thickness only needs to be small at least in the periphery or along a part of the vicinity of the periphery. "Pixel thickness" means a thickness from the reference surface (a surface having an average height) of the substrate. "The pixel thickness is not uniform in the region of the pixel" means that the difference in thickness is 0.1 µm or more. The pixel thickness can be measured by, for example, a non-contact three-dimensional surface profile measuring device using optical interferometry (product name: Micromap 557N; manufactured by: US MicroMap Co.) Hereinafter, a focus will be placed on the case where the pixel has a portion of small thickness in the periphery of the pixel or along the vicinity of the periphery and a portion of the maximum thickness in the part which is closer to the center of the pixel than the portion of small thickness.

Figure 3A:
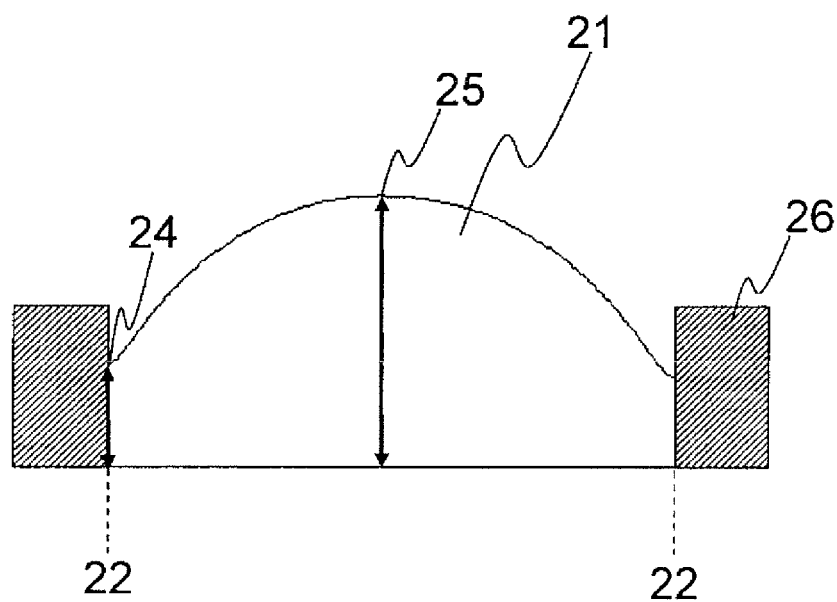
FIG. 3A is a schematic vertical sectional view showing an example of a pixel of the color filter according to the present invention.
Figure 3B:
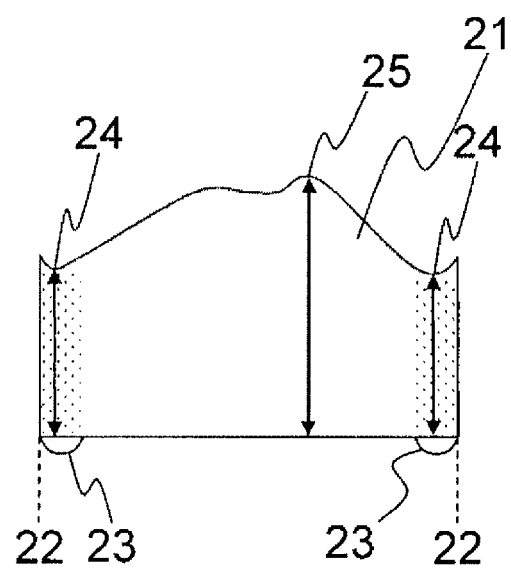
FIG. 3B is a schematic vertical sectional view showing an example of a pixel of the color filter according to the present invention.

Each of FIGS. 3A and 3B shows a cross section of an example of the pixel of the color filter of the present invention, along a direction that is vertical to the transparent substrate. In FIGS. 3A and 3B, a pixel 21 has such a shape that the pixel has a portion of small thickness 24 in a periphery 22 of the pixel or along a vicinity 23 of the periphery and a portion of the maximum thickness 25 in the part which is closer to the center of the pixel than the portion of small thickness 24.

A pixel with non-uniform thickness, such as the above-described pixel having a cross-sectional shape in which a part near the center swells up, is obtained when forming by an ink-jet method, for example. Use of the ink-jet method is advantageous in that it is able to form minute and precise pixels and realize cost reduction and increased yield. The pixel with non-uniform thickness, such as the above-described pixel having a cross-sectional shape in which a part near the center swells up, can be formed by methods other than the ink-jet method.

The pixel as described above, having a cross-sectional shape in which a part near the center swells up, is far different from the shape of a pixel formed by photolithography. In the pixel formed by photolithography, the pixel thickness is almost uniform, and when the pixel has a portion of non-uniform thickness, generally, no swelling is present in a part near the center, while a swelling is present in a part where the edge of the pixel overlies the light-shielding member.

The pixels of the color filter of the present invention are such that at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A). The blue pixel which contains a specific pigment in a specific amount and a specific pigment dispersing agent, is able to show excellent heat resistance and prevent discoloration or a decrease in luminance or contrast, while realizing a specific color, even though it is formed by the ink-jet method and has a cross-sectional shape as described above, in which a part near the center swells up, for example. Although having non-uniform thickness, the pixel has a good shape which has a relatively small difference in film thickness, so that it is able to obtain excellent luminance and contrast.

The pigment comprising C.I. pigment blue 15:6 and C.I. pigment violet 23 (A) and the pigment dispersing agent comprising a polyallylamine derivative (B) are preferably the same as those of the ink-jet ink composition, so that they will not be described here. On the other hand, the cured resin (C') is a resin obtained by curing a curable binder. As described under the "ink-jet ink for a color filter," preferably, the cured resin (C') is a resin obtained by heat-curing the thermosetting binder (C). The thermosetting binder (C) is preferably the same as that of the ink-jet ink composition, so that it will not be described here.

When the blue pixel has a film thickness of 2.0 μm and shows a value y of 0.105 under illuminant C, the content of the pigment dispersing agent comprising a polyallylamine derivative (B) is preferably 5 to 20% by weight of the blue pixel, more preferably 5 to 14% by weight, from the viewpoint of physical properties such as tinting strength and heat resistance. In the pixel, "film thickness of 2.0 μm" means that the average film thickness of the non-uniform film formed by the ink-jet method is 2.0 μm.

Also, when the blue pixel has a film thickness of 2.0 μm and shows a value y of 0.105 under illuminant C, the weight ratio of the pigment (A) to the solid content other than the pigment (A) (the pigment/the solid content other than the pigment) is preferably 0.1 to 0.4, more preferably 0.15 to 0.3, from the viewpoint of physical properties such as tinting strength and heat resistance.

The pigment of the blue pixel preferably has an average dispersed particle diameter of 10 to 100 nm, more preferably 30 to 60 nm, from the point of view that it is able to increase luminance and contrast when realizing a specific color.

An electron microscope is used to measure the average dispersed particle diameter of the pigment in the blue pixel. For example, the average dispersed particle diameter can be obtained as follows: the blue pixel is cut into thin layers in a cross-sectional direction by a focused ion beam system (FIB) such as FB-2000A manufactured by Hitachi, Ltd., and the section of the thin layer samples are observed by a transmission electron microscope for example (such as JEM-200CX manufactured by JEOL Ltd., accelerating voltage 100 kV) at a magnification of 10,000 to 500,000 to measure short- and long-axis diameters, thus obtaining the average of the short- and long-axis diameters as the particle diameter. One hundred or more particles are chosen and the volume (weight) of each particle is approximated by a rectangular parallelepiped with the above-obtained diameters, followed by obtaining the volume average particle diameter, and the volume average particle diameter is used as the average particle diameter herein.

In general, pixels are composed of those in three colors which are red (R), green (G) and blue (B). The coloring pattern shape of the pixels can be a known arrangement such as a stripe type, a mosaic type, a triangle type, four-pixel arrangement, etc., and the coloring area can be set optionally.

The thickness of pixels is generally about 0.5 to 2.5 μm. The thickness of pixels can be changed by color and set to an appropriate thickness so that the thickness gets thicker in the order of the red pixel 7R (this is the thinnest), the green pixel 7G and blue pixel 7B.

(Light-Shielding Member)

To improve the contrast of a displayed image, the light-shielding members 6 are disposed between the pixels 7R, 7G and 7B to surround the outside of the pixel-forming region. The light-shielding member 6 can be a thin metallic film of chrome or the like, formed by a sputtering method, a vacuum deposition method, etc. Or, the light-shielding member 6 can be a resin layer containing a resin binder containing light-shielding particles such as fine carbon particles, a metal oxide, an inorganic pigment or an organic pigment. In the case of a resin layer containing light-shielding particles, it can be patterned by a method in which patterning is conducted by development using a photosensitive resist and a method in which patterning is conducted using an ink-jet ink containing light-shielding particles.

The thickness of the light-shielding member is about 1,000 to 2,000 Å in the case of a thin metal film and is about 0.5 to 2.5 μm in the case of a light-shielding resin layer.

The light-shielding member can also contain a liquid repellent material that shows liquid repellency. By containing such a liquid repellent material, it is able to obtain a substrate having a light-shielding member with excellent liquid repellency, without conducting a process of imparting liquid repellency to the light-shielding member (liquid repellency imparting process) prior to the pixel forming process. When the light-shielding member has excellent liquid repellency, in the below-described ink layer forming process, it is able to effectively prevent the ink-jet ink ejected to an opening surrounded by the light-shielding members from being leaked to an adjacent opening, thereby preventing the occurrence of color mixing in the color filter.

The liquid repellent material used in the present invention is not particularly limited as long as it is a material that is able to show the desired liquid repellency when formed into the light-shielding member. Examples of such a liquid repellent material include a fluorine-containing compound and fine particles of low surface energy material.

As the fluorine-containing compound, for example, there may be mentioned monomers or oligomers of compounds represented by the following formula (1) or (2):

$$Rf\text{—}X\text{—}Rf' \qquad \text{Formula (1)}$$

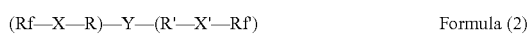

$$(Rf\text{—}X\text{—}R)\text{—}Y\text{—}(R'\text{—}X'\text{—}Rf') \qquad \text{Formula (2)}$$

In the formula (1) or (2), Rf and Rf' are a fluoroalkyl group each; R and R' are an alkylene group each; Rf and Rf' may be the same or different; R and R' may be the same or different; X, X' and Y are any of —COO—, —OCOO—, —CONR"—, —OCONR"—, —SO$_2$NR"—, —SO$_2$—, —SO$_2$O—, —O—, —NR"—, —S—, —CO—, OSO$_2$O— and —OPO(OH)O—; X, X' and Y may be the same or different; and R" is an alkyl group or hydrogen.

As the fluorine-containing compound, there may be used polytetrafluoroethylene, perfluoroethylene propylene resin, perfluoroalkoxy resin, etc.

Examples of the fine particles of low surface energy material include fine particles of polyvinylidene fluoride, fluoroolefin vinyl ether copolymers, trifluoroethylene-vinylidene fluoride copolymer, etc., and silicone fine particles.

It is also possible to form hydrophilic/hydrophobic pattern in which the liquid repellency of the light-shielding member is made higher than that of the surface of the substrate in the opening by exposing the pattern to plasma using a fluorine compound or the like as an introduced gas.

The protecting film 8, transparent electrode film 9, orientation film 10, columnar spacer 12 and so on are not particularly limited and can be appropriately formed by conventionally known methods using conventionally known materials.

(Other Layers)

The color filter of the present invention can also contain other members that are usually formed in color filters. For example, in the case of forming a color filter by an ink-jet method, there may be a partition between pixels. The partition for the ink-jet method will be described below in connection with the production method by the ink-jet method.

3. Method for Producing Color Filter

The method for producing a color filter of the present invention is a method for producing a color filter, comprising: a process of forming an ink layer by selectively depositing the ink-jet ink composition for a color filter according to the present invention by an ink-jet method, and a process of forming a pixel by curing the ink layer.

The method for producing a color filter of the present invention uses the ink-jet method, so that it is able to realize cost reduction and high yield and is thus a productive production method.

An example of the method for producing a color filter of the present invention will be described by reference to FIGS. 4A to 4E.

Figure 4A:
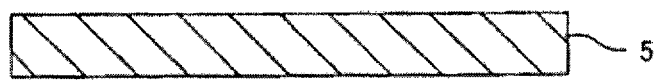
FIGS. 4A to 4E are illustrative drawings each representing an example of the method for producing a color filter using the ink-jet ink of the present invention.

First, as shown in FIG. 4A, a transparent substrate for a color filter is provided.

Figure 4B:

Next, as shown in FIG. 4B, the light-shielding members 6 are formed in the regions each of which will be a boundary between the pixels on one side of the transparent substrate 5. In the case of forming a thin metallic film as the light-shielding member 6, the light-shielding member 6 can be formed by patterning the thin metallic film. As the patterning method, there may be used a general patterning method such as a sputtering method, vacuum deposition method, etc.

Also, in the case of forming a layer containing light-shielding particles such as fine carbon particles, a metal oxide, an inorganic pigment or an organic pigment as the light-shielding member 6, there may be used a patterning method that is a generally used method such as a photolithography method, printing method, etc. It is also possible to form the layer by the ink-jet method as with the below-described pixel 7.

As needed, an ink-repellent partition can be formed in the center of the light-shielding member in the width direction, the partition being narrower in width than the light-shielding member. The composition of such an ink-repellent partition is not particularly limited as long as it is a resin composition with ink repellency. Also, it is not needed to be transparent and may be colored. For example, there may be used a material which is used for the light-shielding member and is not mixed with a material in black. The above-mentioned liquid repellent materials are suitably used. The ink-repellent partition can be one of which surface is treated with an ink-repellent treating agent such as a silicon compound or fluorine-containing compound.

The ink-repellent partition can be patterned by printing using a coating liquid of an ink-repellent resin composition, or by photolithography using a photocurable coating liquid. The height of the ink-repellent partition is preferably high to some degree because, as described above, it is disposed to prevent inks from mixing when coloring by the ink-jet method. Considering the overall flatness of the color filter to be produced, the height is preferably close to the thickness of the pixels. In particular, preferably, it is generally in the range of 0.1 to 2.5 μm, although it varies depending on the deposited amount of the ejected ink.

Figure 4C:
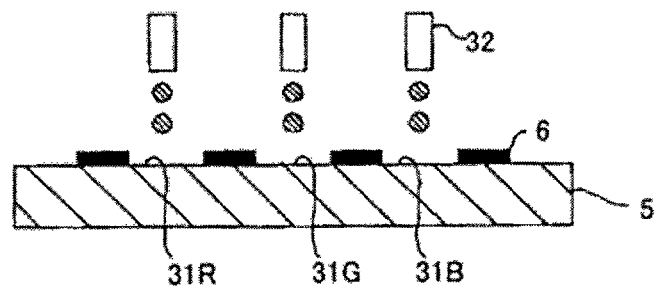

Next, the ink-jet ink for a color filter of the present invention is prepared for the blue (B) ink, and ink-jet inks for a color filter are also prepared, each of the inks comprising a green (G) or red (R) pigment. As shown in FIG. 4C, an ink layer is formed by selectively depositing each of the ink-jet inks for forming pixels to pixel-forming region 31R, 31G or 31B in the corresponding color, the regions being defined by the pattern of the light-shielding members 6 on the surface of the transparent substrate 5. The ink layers are formed so that red, green and blue patterns are arranged in the desired arrangement such as a mosaic type, a stripe type, a triangle type, four-pixel arrangement, etc. In this ink-ejecting process, the ink-jet inks are needed to prevent viscosity increase at the nozzle end of a head 32 and to keep excellent ejection properties. In this case, it is able to accurately deposit the corresponding colored ink to a predetermined pixel-forming region evenly, thereby forming a pixel with a precise pattern and without color non-uniformity and color missing. It is also possible to eject the ink-jet inks in the three colors for forming pixels to the substrate using multiple nozzle heads, so that production efficiency can be increased higher than the case of forming a pixel in each color by a printing method, etc.

Figure 4D:
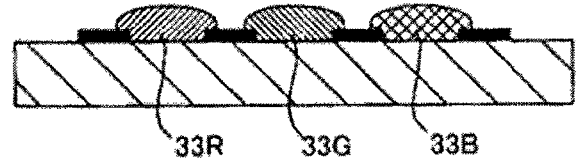

Next, as shown in FIG. 4D, ink layers 33R, 33G and 33B in the three colors are dried and, as needed, pre-baked. Then, they are cured appropriately by exposure to light and/or heating. When the ink layers are appropriately exposed to light and/or heated, crosslinkable components of the curable resin contained in each ink-jet ink cause crosslinking reaction, thereby curing the ink layers and thus forming pixels.

Figure 4E:
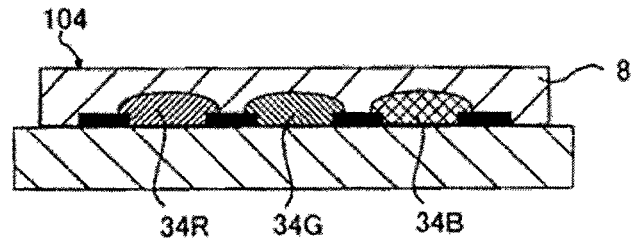

Then, as shown in FIG. 4E, the protecting film 8 is formed on the side of the transparent substrate, on which a pixel 34R, a pixel 34G and a pixel 34B are formed. The protecting film can be formed with a transparent resin composition and by a method such as spin coating, roll coating, spraying and printing. For example, it is preferable to form the protecting film in such a manner that after the composition is applied by spin coating in the range of 500 to 1500 rotation/minute, the applied composition is cured by exposure to light and/or heating.

The transparent electrode on the protecting film is formed with indium tin oxide (ITO), zinc oxide (ZnO), tin oxide (SnO) or the like, or a mixture thereof, by a general method such as a sputtering method, a vacuum deposition method, a CVD method, etc. The transparent electrode can be formed in a predetermined pattern by etching with a photoresist or using a jig, as needed.

The transparent electrode can be formed in other ways, such as a method that is the same as the general color filter forming method.

4. Liquid Crystal Display Device

The liquid crystal display device according to the present invention is a liquid crystal display device in which a display-side substrate and a liquid crystal driving-side substrate are faced each other and liquid crystal is injected therebetween, wherein the display-side substrate is the color filter according to the present invention or a color filter produced by the method according to the present invention.

The liquid crystal display device of the present invention uses the color filter as described above, which has pixels with high luminance and contrast, so that it is a high-quality liquid crystal display device with high productivity.

When a color filter 103 (a display-side substrate) as obtained above faces a TFT array substrate (a liquid crystal driving-side substrate) and a rim of the inner surface of the color filter and that of the TFT array substrate are attached with a sealing agent, they are attached in a state of holding cell gaps at a predetermined distance. Then, the gap between the substrates is filled with liquid crystal and sealed closely, thereby obtaining a color active matrix liquid crystal display device which belongs to the liquid crystal display device of the present invention.

Other constituents of the liquid crystal display device and the method for producing the liquid crystal display device will not be described here since generally used constituents and methods can be used.

The liquid crystal display device of the present invention is not particularly limited as long as it has the above-described color filter, and examples thereof include conventionally known liquid crystal display devices such as an IPS (in-plane switching) type, an STN (super twisted nematic) type, a TN (twisted nematic) type, a ferroelectric type, an antiferroelectric type and an MVA mode type.

The present invention is not limited by the above-mentioned embodiments. The above-mentioned embodiments are examples, and any that has the substantially same essential features as the technical ideas described in claims of the present invention and exerts the same effects and advantages is included in the technical scope of the present invention.

EXAMPLES

Hereinafter, the present invention will be explained in more detail by way of examples. The scope of the present invention is not restricted by these examples. All designations of "part" or "parts" are part or parts by weight unless otherwise specifically indicated.

Production Example 1

Synthesis of Binder Type Epoxy Compound

In accordance with the formulation shown in Table 1, 40.7 parts by weight of diethylene glycol monobutylether acetate (also known as butyl carbitol acetate, hereinafter may be referred to as BCA), which is a solvent containing no hydroxyl group, was put in a four-neck flask equipped with a thermometer, reflux condenser, stirrer and dropping funnel, and the temperature was raised to 140° C. by heating with stirring. Then, 54.7 parts by weight of a mixture (a dropping material) of monomers and a polymerization initiator which were mixed at the ratio shown in Table 1 was dropped into the solvent from the dropping funnel at a constant speed for two hours at 140° C. After the dropping operation, the temperature was decreased to 110° C. and 4.6 parts by weight of a mixture (an additional catalyst component) of a polymerization initiator and diethylene glycol monobutylether acetate (BCA), which is a solvent containing no hydroxyl group, was added thereto, and the resulting mixture was kept at a temperature of 110° C. for two hours to finish the reaction, thereby obtaining a binder type epoxy compound, which has a property shown in Table 1.

TABLE 1

|  |  | Production Example 1 |
|---|---|---|
| Initially used solvent (Parts by weight) | Diethylene glycol monobutylether acetate (BCA) | 40.7 |
| Dropping material (*1) (Parts by weight) | GMA | 10 |
|  | MMA | 40 |
|  | PERBUTYL O | 4.7 |

TABLE 1-continued

|  |  | Production Example 1 |
|---|---|---|
| Additional catalyst component (Parts by weight) | PERBUTYL O | 0.30 |
|  | Diethylene glycol monobutylether acetate (BCA) | 4.3 |
| Property | Weight average molecular weight (*2) | 20,000 |

(*1) The meaning of the abbreviations shown in Table 1 are as follows. GMA: Glycidyl methacrylate MMA: Methyl methacrylate PERBUTYL O: t-butylperoxy-2-ethylhexanoate (PERBUTYL O is a product name and manufactured by NOF Corporation)
(*2) Weight average molecular weight: A polystyrene-equivalent value obtained by gel permeation chromatography

Examples 1 to 3 and Comparative Examples 1 and 2

Production of Ink-Jet Ink Composition for a Color Filter (1) Production of Pigment-Dispersed Liquid A pigment, pigment dispersing agent and organic solvent were mixed at the below-mentioned ratio. the mixture, 500 parts by weight of zirconia beads having a diameter of 0.3 mm was added and dispersed for four hours with a paint shaker (manufactured by Asada Iron Works Co., Ltd.), thereby producing a PB15:6 (C.I. pigment blue 15:6) pigment-dispersed liquid and a PV23 (C.I. pigment violet 23) pigment-dispersed liquid.

[Composition of Pigment-Dispersed Liquid]
Pigment: 10 parts by weight
Pigment dispersing agent (AJISPER Pb821 manufactured by Ajinomoto Fine-Techno. Co., Inc., a solid content of 30% by weight in an organic solvent): 20 parts by weight
BCA (Diethylene glycol monobutylether acetate): 50 parts by weight (2) Production of Binder Composition A rotor covered by Teflon (trademark) was put in a sample bottle and the bottle was set on a magnetic stirrer. In accordance with the below-mentioned ratio, the binder type epoxy compound described in Production Example 1, a polyfunctional epoxy resin and so on were put in the sample bottle and mixed sufficiently at room temperature. Then, to control the viscosity, BOA (a diluting solvent) was added thereto and dissolved by stirring. The resulting mixture was filtered to obtain a binder composition.

[Formulation of Binder Composition]
The binder type epoxy compound of Production Example 1 (a solid content of 30% by weight in solvent BCA): 10 parts by weight
Polyfunctional epoxy resin (product name: Epikote 154, manufactured by Japan Epoxy Resins Co., Ltd.): 2 parts by weight
Neopentyl glycol glycidyl ether: 1 part by weight
Trimellitic acid: 2 parts by weight
BCA (Diethylene glycol monobutylether acetate): 1 part by weight (3) Production Of Ink-Jet Ink In accordance with the formulations shown in Table 2, the above-obtained PB15:6 (C.I. pigment blue 15:6) pigment-dispersed liquid and PV23 (C.I. pigment violet 23) pigment-dispersed liquid were mixed with the above binder solution and a solvent and the resulting mixture was stirred sufficiently, thereby obtaining ink-jet ink compositions for a color filter of Examples 1 to 3 and Comparative Examples 1 and 2, each of which is able to form a film having a film thickness of 1.9 μm and showing a value y of 0.105 under illuminant C. In Table 2, the second solvent "EEP" is ethyl 3-ethoxypropionate.

TABLE 2

|  |  | Example 1 | Example 2 | Example 3 | Comparative Example 1 | Comparative Example 2 |
|---|---|---|---|---|---|---|
| Pigment | C.I. pigment blue 15:6 | 3.48 | 3.07 | 2.68 | 6.02 | 4.12 |
|  | C.I. pigment violet 23 | 0.30 | 0.34 | 0.40 | 0.00 | 0.22 |
| Pigment dispersing agent | AJISPER Pb821 | 2.27 | 2.05 | 1.85 | 3.61 | 2.60 |
| Binder | Binder type epoxy compound (Production Example 1) | 4.62 | 4.84 | 5.04 | 3.27 | 4.29 |
|  | Polyfunctional epoxy resin | 3.08 | 3.23 | 3.36 | 2.18 | 2.86 |
|  | Neopentyl glycol glycidyl ether | 1.54 | 1.61 | 1.68 | 1.09 | 1.43 |
|  | Trimellitic acid | 3.08 | 3.23 | 3.36 | 2.18 | 2.86 |
| First solvent | BCA | 71.63 | 71.63 | 71.63 | 71.63 | 71.63 |
| Second solvent | EEP | 10.00 | 10.00 | 10.00 | 10.00 | 10.00 |
| Total |  | 100.0 | 100.0 | 100.0 | 100.0 | 100.0 |

[Evaluation Method]

The added amount of violet 23 (V23) in the pigment, the weight ratio of the pigment to the solid content other than the pigment (the pigment/the solid content other than the pigment: P/V), and the amount of the pigment dispersing agent in the solid content are shown in Table 3, all of which are those of Examples and Comparative Examples when formed into a film having a film thickness of 1.9 μm and showing a value y of 0.105 under illuminant C.

(1) Limit of Solid Content

The upper limit of the solid content in the ink compositions of Examples and Comparative Examples were found, all of the limits are those when the ratio of the pigment, pigment dispersing agent and binder is fixed; the amount of the second solvent is set to 10% by weight of the whole ink amount; and the amount of the first solvent (BCA) is increased or decreased appropriately, so that the ink compositions of Examples and Comparative Examples meets the appropriate viscosity which is appropriate for ejection by the ink-jet method (a viscosity of 10.5 mPa·s at 23° C.). Table shows the thus-found results. The viscosity was measured with an automated micro viscometer AMVn (product name, manufactured by NIHON SIBERHEGNER K.K.)

(2) Rate of Decrease in Luminance (Y) when Heating (a) Formation of Coating Film Each of the above-obtained ink-jet ink compositions was applied entirely to a surface of a glass substrate having a thickness of 0.7 mm and a size of 10 cm×10 cm (product name: NA35, manufactured by NH Techno Glass Corporation) by spin coating, thereby forming a film having a film thickness of 1.9 μm so as to show a value y of 0.105 under illuminant C. The dried film thickness of the film obtained by spin coating was measured with a contact-type film thickness measuring device (product name: Dectak-3030ST, manufactured by: Japan Vacuum Engineering Co. Ltd.)

(b) Measurement of Luminance

After forming the films, the luminance of each film was measured before and after a heating test (at 240° C. for 200 minutes). When the measurement result before and after the heating test were considered as $Y_1$ and $Y_2$, respectively, the rate of decrease in luminance ($\Delta Y$) was obtained by the following formula. The luminance was measured with a microspectrophotometer (product name: OSP200, manufactured by: Olympus Corporation). The results are shown in Table 3.

$$\Delta Y(\%) = (Y_2 - Y_1)/Y_2 \times 100$$

The heat resistance (an effect of preventing a decrease in luminance) of the films were evaluated by the following evaluation criterion. The results are also shown in Table 3.

[Evaluation Criterion]

○: The rate of decrease in luminance is less than 8% x: The rate of decrease in luminance is 8% or more.

(3) Evaluation of Prevention of Ink Composition Deposited by Ink-Jet Method from Overflowing A black matrix pattern having a line width of 20 μm and a film thickness of 2.2 μm was formed by photolithography with a curable resin composition for black matrix on a glass substrate having a thickness of 0.7 mm and a size of 10 cm×10 cm (product name: NA35, manufactured by: NH Techno Glass Corporation). A plasma treatment was performed on the black matrix pattern using fluorine gas as introduced gas, thereby forming a hydrophilic/hydrophobic pattern in which the liquid repellency of the black matrix is made higher than that of the surface of the substrate in an opening. Each of the above-obtained ink-jet ink compositions was deposited by the ink-jet method to the pixel-forming portions defined by the black matrix on the substrate. Then, the resultant was dried under reduced pressure for 120 seconds at 10 Torr; moreover, it was pre-baked on a hot plate at 80° C. for 10 minutes. Then, in a clean oven, the resultant was post-baked by heating at 200° C. for 30 minutes; moreover, it was post-baked at 240° C. for 30 minutes, thereby forming a pixel pattern having an average film thickness of 2.0 μm on the substrate.

Figure 5A:
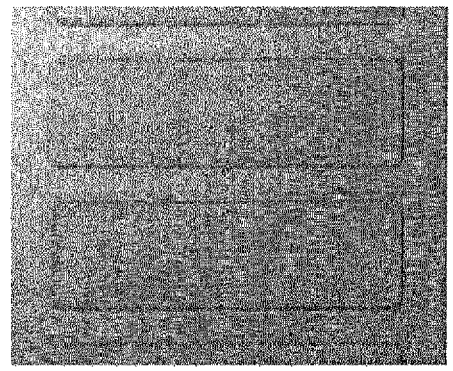
FIGS. 5A to 5C are pictures each showing an example of the case where pixels are formed with the ink-jet ink inside pixel-forming portions defined.
Figure 5B:
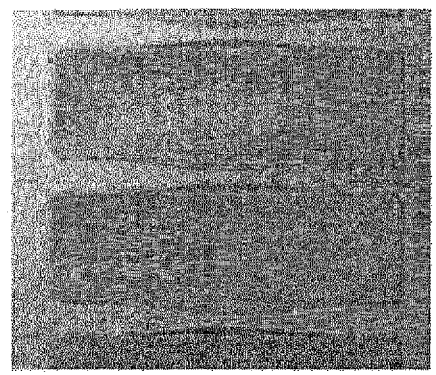
Figure 5C:
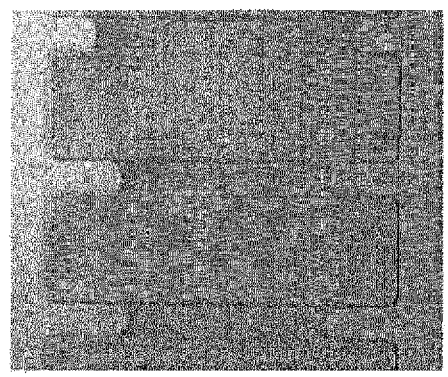

Hundred pixels of the thus-obtained pixel pattern was observed with a microscope and evaluated by the following evaluation criterion. The thus-obtained results are shown in Table 3. In the evaluation criterion, "oversized pixel" means a pixel in such a state that, as shown in FIG. 5B, the ink composition overflows from the pixel-forming portions to the black matrix; "overflowing pixel" means a pixel in such a state that, as shown FIG. 5C, the ink composition overflows from the pixel-forming portions to the black matrix and reaches adjacent pixel-forming portions; "normal pixel" means a pixel in such a state that, as shown in FIG. 5A, the ink composition is patterned inside the pixel-forming portions defined, without oversizing and overflowing.

[Evaluation Criterion]

⊚: As a result of observing 100 pixels, they are neither oversized nor overflowing pixels and are all normal pixels.

○: As a result of observing 100 pixels, there is no overflowing pixel; however, there is an oversized pixel.
x: As a result of observing 100 pixels, there is an overflowing pixel.

TABLE 3

|  | Amount of V23 (% by weight) | P/V | Amount of dispersing agent (in solid content) | Limit of solid content | Rate of decrease in luminance (Y) when heating | Heat resistance (effect of preventing decrease in luminance | Prevention of ink composition deposited by ink-jet method from overflowing |
|---|---|---|---|---|---|---|---|
| Example 1 | 8 | 0.259 | 12.3% | 20.5% | 7.2% | ○ | ◎ |
| Example 2 | 10 | 0.228 | 11.1% | 21.2% | 6.4% | ○ | ◎ |
| Example 3 | 13 | 0.201 | 10.1% | 21.7% | 5.8% | ○ | ◎ |
| Comparative Example 1 | 0 | 0.488 | 19.7% | 15.7% | 11.1% | X | X |
| Comparative Example 2 | 5 | 0.309 | 14.2% | 19.5% | 8.5% | X | ○ |

All of the results are those of Examples and Comparative Examples when formed into a film having a film thickness of 1.9 μm and showing a value y of 0.105 under illuminant C.

REFERENCE SIGNS LIST

1. Color filter
2. Electrode substrate
3. Gap
4. Sealing material
5. Transparent substrate
6. Light-shielding member
7 (7R, 7G and 7B). Pixel
8. Protecting film
9. Transparent electrode film
10. Orientation film
11. Pearl
12. Columnar spacer
21. Pixel
22. Periphery
23. Vicinity of the periphery
24. Portion of small thickness
25. Portion of the maximum thickness
26. Light-shielding member
31. Pixel-forming region
32. Ink-jet head
33. Ink layer
34. Pixel
101 and 102. Color liquid crystal display device
103. Color filter

The invention claimed is:

1. A color filter comprising a transparent substrate and pixels provided thereon, wherein pixel thickness is not uniform; and thickness difference in each single pixel is 0.1 μm or more; at least one of the pixels is a blue pixel comprising (A) a pigment comprising C.I. pigment blue 15:6 and C.I. pigment violet 23, (B) a pigment dispersing agent comprising a polyallylamine derivative, and (C') a cured resin; and in the blue pixel, the content of C.I. pigment violet 23 is 8 to 30% by weight of the pigment (A); the content of the pigment dispersing agent (B) is 10.1 to 12.3% by weight of the blue pixel; and the weight ratio of the pigment (A) to the solid content other than the pigment (A) (the pigment/the solid content other than the pigment) is 0.201 to 0.259.

2. The color filter according to claim 1, wherein the blue pixel has a film thickness of 2.0 μm and shows a value y of 0.105 under illuminant C.

3. The color filter according to claim 1, wherein the pigment of the blue pixel has an average dispersed particle diameter of 10 to 100 nm.

* * * * *